US011864559B2

(12) United States Patent
Filutowicz et al.

(10) Patent No.: US 11,864,559 B2
(45) Date of Patent: Jan. 9, 2024

(54) THERAPEUTIC AMOEBA AND USES THEREOF

(71) Applicant: AmebaGone, LLC, Madison, WI (US)

(72) Inventors: Marcin Filutowicz, Madison, WI (US); Ryan Kessens, Madison, WI (US); Amy Jancewicz, Madison, WI (US)

(73) Assignee: AmebaGone, LLC, Madison, WI (US)

( * ) Notice: Subject to any disclaimer, the term of this patent is extended or adjusted under 35 U.S.C. 154(b) by 685 days.

(21) Appl. No.: 16/904,367

(22) Filed: Jun. 17, 2020

(65) Prior Publication Data

US 2020/0397003 A1 Dec. 24, 2020

Related U.S. Application Data

(60) Provisional application No. 62/862,994, filed on Jun. 18, 2019.

(51) Int. Cl.
*A01N 63/00* (2020.01)
*A23L 19/12* (2016.01)
*A23B 7/155* (2006.01)

(52) U.S. Cl.
CPC .............. *A01N 63/00* (2013.01); *A23B 7/155* (2013.01); *A23L 19/12* (2016.08); *A23V 2002/00* (2013.01)

(58) Field of Classification Search
None
See application file for complete search history.

(56) References Cited

U.S. PATENT DOCUMENTS

| 9,603,368 B2 * | 3/2017 | Gage | A01N 63/00 |
| 2014/0056850 A1 * | 2/2014 | Filutowicz | A01N 63/00 424/93.1 |

OTHER PUBLICATIONS

Raper et al. "Growth of Dictyostelium discoideum upon pathogenic bacteria". Journal of Bacteriology. Am. Soc Microbiol. 1939, pp. 431-442.*
Perombelon et al. "Potato diseases caused by soft rot erwinias: an overview of pathogenesis". Plant Pathology, 2002, 51, pp. 1-12.*
Hubalek Z. "Protectants used in the cryopreservation of microorganisms". Cryobiology, 2003, 46, pp. 205-209.*
Qu et al. Plant Pathology, 2001, 50, pp. 420-426.*
Al-Mughrabi. Post harvest treatment with hydrogen peroxide suppresses silver scurf (*Helminthosporium solani*), dry rot (*Fusarium sambucinum*), and soft rot (*Erinia carotovorum* supsp. *Carotovorum*) of stored potatoes. The Americas Journal of Plant Science and Biotechnology. 2010, 4(2): 74-81.
Birch et al., Crops that feed the world 8: Potato: are the trends of increased global production sustainable? Food Security. 2012, 4(4):477-508.
Brandwein et al., Mitigation of Biofilm Formation on Corrugated Cardboard Fresh Produce Packaging Surfaces Using a Novel Thiazolidinedione Derivative Integrated in Acrylic Emulsion Polymers. Frontiers in Microbiology. 2016, 7(159): 1-9.
Brefeld. Dictyostelium mucoroides. Ein neuer Organismus aus der Verwandtschaft der Myxomyceten. Abh. Seckenberg Naturforsch. Ges. 1869, 7:85-107.
Cavender et al., The Acrasieae in Nature. I. Isolation. Am J Bot. 1965, 52:294-6.
Chakraborty et al., The reduction of root colonization by mycorrhizal fungi by mycophagous amoebae. Canadian J. of Microb. 1985, 31:295-297
Charkowski. Biology and control of Pectobacterium in potato. American Journal of Potato Research. 2015, 92(2):223-229.
Chen et al., Immune-like phagocyte activity in the social amoeba. Science. Aug. 3, 2007;317(5838):678-81.
Czajkowski et al., Control of blackleg and tuber soft rot of potato caused by *Pectobacterium* and *Dickeya* species: a review. Plant Pathology. 2011, 60(6):999-1013.
Diallo et al., Mechanisms and recent advances in biological control mediated through the potato rhizosphere. FEMS Microbiol Ecol. Mar. 2011;75(3):351-64.
Duczek et al., Populations of amoebae which feed on conidia and hyphae of Bipolaris sorokiniana in Queensland soils. J Australasian Plant Pathology vol. 20, 1991: 81-85.
Elphinstone et al., Control of contamination of potatoes with air-borne Erwinia carotovora by foliar application of copper oxychloride. Ann. Appl. Biol. 1987, 110(3): 535-544.
Erdos et al., Mating Types and Macrocyst Formation in Dictyostelium discoideum. Proc Natl Acad Sci U S A. Jun. 1973;70(6):1828-30.
Erdos et al., Sexuality in the cellular slime mold Dictyostelium giganteum. Proc Natl Acad Sci U S A. Mar. 1975;72(3):970-3.
Kastelein et al., Preliminary selection of antagonists of *EnNinia carotovora* subsp.*atroseptica* (Van Hall) Dye for application during green crop lifting of seed potato tubers. Potato Research. 1999, 42(1):161-171.
Konijn et al., Cell aggregation in Dictyostelium discoideum. Dev Biol. Dec. 1961;3:725-56.
Lim et al., Biocontrol of *Pectobacterium carotovorum* subsp. *carotovorum* using bacteriophage PP1. J Microbiol Biotechnol. Aug. 2013;23(8):1147-53.
Nickerson et al., Macrocysts in the life cycle of the Dictyosteliaceae. I. Formation of the Macrocysts. American Journal of Botany. 1973, 60(2): 190-197.
Nickerson et al., Macrocysts in the life cycle of the Dictyosteliaceae. II. Germination of the macrosysts. American Journal of Botany. 1973, 60(3): 247-254.
Old et al., Fine structure of a new mycophagous amoeba and its feeding on Cochliobolus sativus. Soil Biol, Biochem. 1985, vol. 17, No. 5, pp. 645-655.
Olsen et al., Disinfecting Potato Equipment and Storage Facilities. University of Idaho Extension. 2011. 5 pages.
Olsen et al., Efficacy of chlorine dioxide for disease control on stored potatoes. American Journal of Potato Research. 2003, 80(6): 387-395.
Olsen et al., Storage management options for disease control. Dept. of Plant, Soil and Entomological Sciences. University of Idaho. Retrieved from the internet Aug. 11, 2022. 3 pages.

(Continued)

*Primary Examiner* — Vera Afremova
(74) *Attorney, Agent, or Firm* — CASIMIR JONES, S.C.; Tanya A. Arenson

(57) ABSTRACT

The present disclosure relates to amoebae (slime molds) and uses thereof. In particular, the present disclosure relates to the use of amoebae or their environmentally stable spores to control agricultural infections and other uses.

17 Claims, 5 Drawing Sheets

(56) References Cited

OTHER PUBLICATIONS

Perombelon et al., Dispersion of Erwinia carotovora in Aerosols Produced by the Pulverization of Potato Haulm Prior to Harvest. Journal of Phytopathology. 1979, 94(3): 249-260.

Perombelon. Potato diseases caused by soft rot erwinias: an overview of pathogenesis. Planet Pathology. 2002, 51 (1):1-12.

Raper. The Dictyostelids. Prinston University Press. Princeton NJ. 1984. TOC only. 4 pages.

Romeralo et al., Two species of dictyostelid cellular slime molds from Alaska. Mycologia. 2010, 102(3):588-595.

Rosenzweig et al., Tuber soft rot, blackleg and aerial stem rot. Michigan Potato Diseases. Michigan State University. 2016. Extension Bulletin E3335. 4 pages.

Sanders et al., Multiple Dictyostelid Species Destroy Biofilms of Klebsiella oxytoca and Other Gram Negative Species. Protist. Jul. 2017;168(3):311-325.

Schaap et al., Molecular phylogeny and evolution of morphology in the social amoebas. Science. 2006; 314(5799): 661-663.

Sharga et al., Bacillus subtilis BS 107 as an antagonist of potato blackleg and soft rot bacteria. Can. J. Microbiol. 1998, 44(8):777-783.

Sheikh et al., A New Classification of the Dictyostelids. Protist. 2018, 169(1):1-28.

Smith et al., New insights into Acinetobacter baumannii pathogenesis revealed by high-density pyrosequencing and transposon mutagenesis. Genes Dev. 2007, 21:601-614.

Swanson et al., Global distribution of forest soil dictyostelids. J Biogeo. 1999, 26(1): 133-48.

Trias et al., Lactic acid bacteria from fresh fruit and vegetables as biocontrol agents of phytopathogenic bacteria and fungi. Int. Microbiol. 2008, 11(4):231-236.

\* cited by examiner

THERAPEUTIC AMOEBA AND USES THEREOF

This application claims priority to U.S. provisional patent application Ser. No. 62/862,994, filed Jun. 18, 2019, which is incorporated herein by reference in its entirety.

FIELD OF THE DISCLOSURE

The present disclosure relates to amoebae (slime molds) and uses thereof. In particular, the present disclosure relates to the use of amoebae or their environmentally stable spores to control agricultural infections and other uses.

BACKGROUND OF THE DISCLOSURE

Farmers across the globe today must produce more food than ever to meet the growing demands of the largest human population that has ever inhabited the Earth. In order to meet this challenge, growers use millions of pounds of chemicals annually to protect crops against pests and diseases that devastate crop yield and quality. Even with chemical controls, estimates of annual crop losses still hover around 40% of the potential yield.

Potatoes are an important agricultural crop that are susceptible to a number of microbial diseases, such as the bacterial disease soft rot. Protocol is important for preventing the spread of bacteria from infected potatoes to clean potatoes (111). Chemical disinfectants are widely used as part of good sanitation practices in agricultural operations for cleaning storage bins, tools, large equipment, and pipes (111). Copper is particularly important for the treatment of bacterial diseases in the organic produce industry since many commercial antimicrobials are not approved for organic use. However, current sanitation practices do not adequately address the challenge posed by bacterial biofilms, which can persist on plastic, wood, and metal surfaces. Bacterial biofilms on these surfaces are tolerant against harsh disinfectants such as bleach, hydrogen peroxide, and quaternary ammonium as well as heavy metals such as copper (35-37, 60).

Current efforts to prevent soft rot are focused on killing bacteria residing on the potato surface and preventing the spread of bacteria from infected tubers through sanitation of tools and facilities. Treatment of seed potatoes with antibiotics, UV light, hot water, and steam have all been shown to reduce *Pectobacterium* populations but are impractical to apply in a large commercial operation (8). Chemical sanitizers such as ethanol, bleach, and copper can also reduce soft rot bacteria on the potato surface but can be toxic and prevent sprouting (38). In summary, these treatments have not been widely adopted due to scalability and toxicity issues.

The only products currently available to mitigate the effects of soft rot in storage use the broad-spectrum disinfectants chlorine dioxide, hydrogen peroxide, and ozone as their active ingredient. While they have shown some potential to prevent soft rot from developing and spreading in storage, they are ineffective once disease has developed (112-114). These products also require frequent or continuous applications that can be challenging to administer in storage facilities containing millions of pounds of potatoes. All of these active ingredients are inactivated by residual soil on the potato surface. This is particularly problematic as potatoes are not washed prior to storage and potatoes harvested from muddy portions of a field are particularly prone to soft rot. Finally, none of these products are approved for use on seed potatoes.

For potato soft rot, there are no approved biocontrol products on the market. While many studies have been undertaken to identify an effective solution for soft rot, none have yet yielded a viable treatment option (115-119). Many of these methods utilize an antagonistic approach that uses a non-pathogenic bacterium to outcompete *Dickeya* or *Pectobacterium* on the tuber. Unfortunately, antagonism does not dismantle established biofilms.

What is needed are new treatments for microbial infections in potatoes.

SUMMARY OF THE DISCLOSURE

The present disclosure relates to amoebae (slime molds) and uses thereof. In particular, the present disclosure relates to the use of amoebae or their environmentally stable spores to control agricultural infections and other uses.

The present disclosure overcomes the limitations of existing chemical and biocontrol products for treating or preventing potato soft rot by providing compositions comprising amoebae that feed on, and neutralize, bacteria responsible for soft rot. The compositions and methods of the present disclosure provide an effective and non-toxic approach for treating and preventing soft rot in potatoes.

For example, in some embodiments, provided herein is a method of treating or preventing a bacterial infection in a potato, wherein the bacteria are *Pectobacterium* sp. and/or *Dickeya* sp., comprising: contacting the plant with a composition comprising one or more species of amoebae. In some embodiments, the bacteria are present as a biofilm. In some embodiments, the composition comprises two or more species of amoebae. In some embodiments, the amoebae are a *Dictyostelium* sp. In some embodiments, the contacting further treats or prevents infection by an additional microorganism (e.g., one or more of *H. solani, Fusarium* sp., or *Streptomyces scabies*).

The present disclosure is not limited to a particular strain of amoebae. For example, in some embodiments, the amoebae is selected from, Cohen 35, Cohen 36, Cohen 8, Cohen 9, Couch C1, DC-6, DC-61, DC-7, WS-116d, WS-15, WS-20, WS-517, WS-588, WS-606, WS-647, WS-666, WS-669, WS-69, WS-269a, WS-269b, WS-380b, WS-462, Maryland 5a, or Za-2a. In some embodiments, the amoebae are Cohen 36, WS-69, and/or Cohen 9. In some embodiments, the strains are one or more of BAC10A, BAF6A, BAC3A, NW2, KB4A, SO8B, SO3A, BAF9B, IC2A, AK1A1, PBF4B, PBF8B, BSB1A, SO5B, PBF3C, PBF6B, NW2B, NW10B, PBF9A, IC5A, ABC8A, NW16B, ABC10B, ABB6B, BA4A, AKK5A, AKK52C, HP4, HP8, or NW9A.

In some embodiments, the potato is in storage. In some embodiments, the contacting treats or prevents soft rot disease in the potato. In some embodiments, the storage is at approximately 10 degrees Celsius (e.g., 2-20, 2-15, 2-10, 4-10, 4-15, 5-10, 5-15, 8-12, 8-15, or 8-20 degrees Celsius). In some embodiments, the contacting comprising contacting seed potatoes prior to planting and/or contacting potatoes after harvest. In some embodiments, the potato is cut, resulting in seed potatoes. In some embodiments, the potato is infected with a bacterium of *Pectobacterium* sp. and/or *Dickeya* sp prior to (e.g., during growth) or during storage.

In some embodiments, the composition further comprises a non-amoebae anti-microbial agent (e.g., fungicide). In some embodiments, the amoebae are lyophilized spores. In some embodiments, the lyophilized spores are lyophilized in the presence of a stabilizer (e.g., a non-fat skim milk buffer and/or a polysaccharide). In some embodiments, the composition is a wettable powder. In some embodiments, the amoebae are present in the composition at a concentration of $1 \times 10^6$ to $1 \times 10^8$ spores/mL, although other concentrations are specifically contemplated.

Additional embodiments provide a composition, kit, or system, comprising: a) one or more species of amoebae, wherein said amoebae are selected from, for example, Cohen 35, Cohen 36, Cohen 8, Cohen 9, Couch C1, DC-6, DC-61, DC-7, WS-116d, WS-15, WS-20, WS-517, WS-588, WS-606, WS-647, WS-666, WS-669, WS-69, WS-269a, WS-269b, WS-380b, WS-462, Maryland 5a, or Za-2a; and b) a carrier (e.g., stabilizer, buffer, fungicide, etc.). In some embodiments, the composition is formulated as a wettable powder, dip, spray, or mist.

Further embodiments provide a composition, kit, or system as described herein for use in treating or preventing infection of a potato by a bacteria of *Pectobacterium* sp. and/or *Dickeya* sp.

Yet other embodiments provide the use of a composition, kit, or system as described herein in treating or preventing infection of a potato by a bacteria of *Pectobacterium* sp. and/or *Dickeya* sp.

Additional embodiments are described herein.

DEFINITIONS

Figure 1:
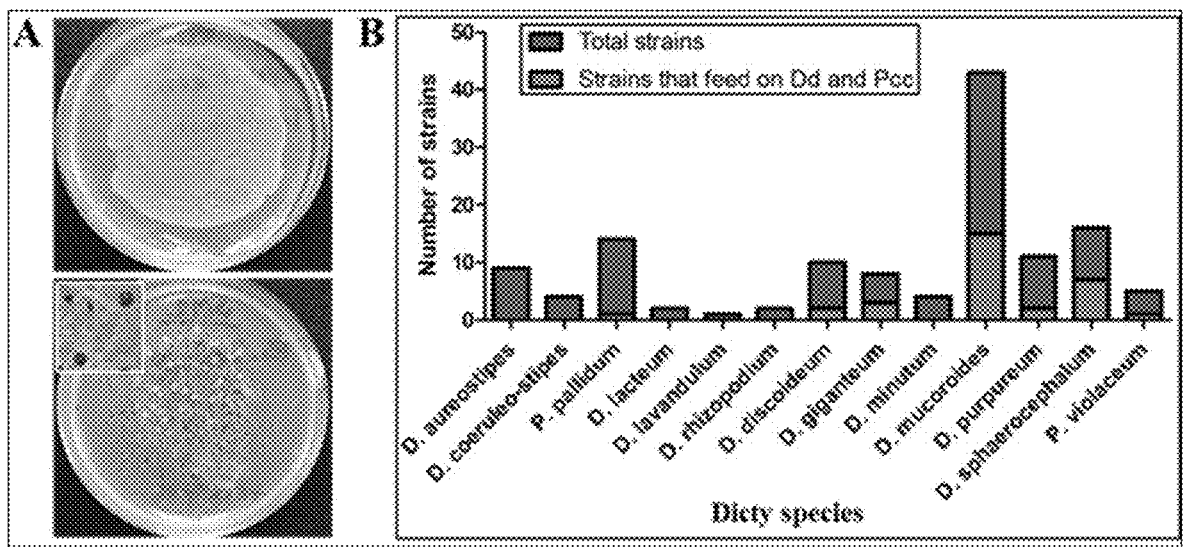
FIG. 1 shows feeding of Dicty on Dd and Pcc. (A) The top panel shows an SM2 agar plate with a lawn of Dd growth. The bottom panel shows a lawn of Dd growth that has been cleared by Dicty strain Couch C1. The black dots, magnified in the inset image, are son containing Dicty spores. (B) The number of strains within a given species capable of feeding on both Dd and Pcc is shown in orange while the total number of strains within a given species is shown in grey.

To facilitate an understanding of the present disclosure, a number of terms and phrases are defined below.

As used herein, the term "pathogen" refers to a biological agent that causes a disease state (e.g., infection, canker, etc.) in a host. "Pathogens" include, but are not limited to, bacteria, fungi, archaea, and the like.

As used herein, the term "microorganism" refers to any species or type of microorganism, including but not limited to, bacteria, archea, fungi, and parasitic organisms.

The terms "bacteria" and "bacterium" refer to all prokaryotic organisms, including those within all of the phyla in the Kingdom Procaryotae. It is intended that the term encompass all microorganisms considered to be bacteria including *Mycoplasma, Chlamydia, Actinomyces, Streptomyces*, and *Rickettsia*. All forms of bacteria are included within this definition including cocci, bacilli, spirochetes, spheroplasts, protoplasts, etc. Also included within this term are prokaryotic organisms that are gram negative or gram positive. "Gram negative" and "gram positive" refer to staining patterns with the Gram-staining process that is well known in the art. (See e.g., Finegold and Martin, Diagnostic Microbiology, 6th Ed., CV Mosby St. Louis, pp. 13-15 [1982]). "Gram positive bacteria" are bacteria that retain the primary dye used in the Gram stain, causing the stained cells to appear dark blue to purple under the microscope. "Gram negative bacteria" do not retain the primary dye used in the Gram stain, but are stained by the counterstain. Thus, gram negative bacteria appear red. In some embodiments, the bacteria are those capable of causing disease (pathogens) and those that cause production of a toxic product, tissue degradation or spoilage.

As used herein, the term "fungi" is used in reference to eukaryotic organisms such as the molds and yeasts, including dimorphic fungi.

As used herein the term "biofilm" refers to an aggregation of microorganisms (e.g., bacteria) surrounded by an extracellular polymeric substance (EPS) (Flemming, H. C., et al. (2007). "The EPS matrix: the "house of biofilm cells"." *J Bacteriol* 189(22): 7945-7947.) or slime adherent on a surface in vivo or ex vivo, wherein the microorganisms adopt altered metabolic states rendering them tolerant to antibiotics and disinfectants.

The term "diagnosed," as used herein, refers to the recognition of a disease by its signs and symptoms (e.g., appearance of a plant), or genetic analysis, pathological analysis, histological analysis, diagnostic assay (e.g., for microorganism infection) and the like.

As used herein the term, "in vitro" refers to an artificial environment and to processes or reactions that occur within an artificial environment. In vitro environments include, but are not limited to, test tubes and cell cultures. The term "in vivo" refers to the natural environment (e.g., a plant) and to processes or reaction that occur within a natural environment.

As used herein, the term "host cell" refers to any eukaryotic or prokaryotic cell (e.g., plant cells), whether located in vitro or in vivo.

As used herein, the term "genome" refers to the genetic material (e.g., chromosomes or plasmids) of an organism or a host cell.

As used herein, the term "effective amount" refers to the amount of a therapeutic agent (e.g., an amoeba) sufficient to effect beneficial or desired results. An effective amount can be administered in one or more administrations, applications or dosages and is not intended to be limited to a particular formulation or administration route.

The term "sample" as used herein is used in its broadest sense. A sample may comprise a cell, tissue, or fluids, nucleic acids or polypeptides isolated from a cell (e.g., a microorganism), and the like.

As used herein, the terms "purified" or "to purify" refer, to the removal of undesired components from a sample. As used herein, the term "substantially purified" refers to molecules that are at least 60% free, preferably 75% free, and most preferably 90%, or more, free from other components with which they are usually associated.

As used herein, the term "modulate" refers to the activity of a compound (e.g., an amoebae) to affect (e.g., to kill or prevent the growth of) a microorganism.

DETAILED DESCRIPTION OF THE DISCLOSURE

The present disclosure relates to amoebae (slime molds) and uses thereof. In particular, the present disclosure relates to the use of amoebae or their environmentally stable spores to control agricultural infections and other uses.

In particular, provided herein are compositions and methods for treating and/or preventing soft rot and other disease in potatoes using amoebae. Potato soft rot is the decay of tubers through enzymatic maceration of tissue by pathogenic bacteria under anaerobic conditions. Species from two bacterial genera, which both produce enzymes that macerate the potato tuber, are known to cause the disease: *Pectobacterium* and *Dickeya* (3-5).

*Dickeya* and *Pectobacterium* species also infect tubers and plants in the field. Aerial stem rot is a disease that occurs in the aerial plant tissue, manifesting as decomposition and wilting under moist conditions, and as desiccation under dry conditions (11, 12). Blackleg develops as black lesions in the lower stem of the potato plant and eventually causes stunting of growth and wilting throughout the plant (4-6, 8, 11, 12). Aerial stem rot and black leg are caused by the same bacteria causing soft rot and each can result as a continuation of soft rot infection in the potato tuber. However, they differ from soft rot by occurring in aerobic conditions and apical portions of the plant (4-6, 8, 13).

Experiments conducted during the course of development of embodiments of the present disclosure demonstrated that certain species and strains of amoebae (e.g., *Dictyostelium* sp.) were able to kill *Pectobacterium* and *Dickeya* under a variety of conditions as well as prevent soft rot in potato samples.

Accordingly, embodiments of the present disclosure provide for the use of amoebae (slime molds) in treatment and prevention of microbial infection, in particular, against some of the most tenacious pathogens (e.g., against soft rot diseases of potatoes). Over close to 1 billion years amoebae have evolved to safely kill a broad range of pathogenic bacteria. They eat pathogens selectively. The utility of amoebic biocontrol derives from spores being an easily transported and upon germination antibacterial amoebae are effective against a broad range of pathogens including drug resistant bacteria.

The existence of soil Dictyostelids has been known for almost one hundred and fifty years (Brefeld O. (1869) Abh. Seckenberg Naturforsch. Ges. 7: 85-107). But it was not until 1965, when Cavender and Raper (Cavender J C, Raper K B. (1965) Am J Bot 52: 294-6) developed a quantitative method for their enumeration, that extensive ecological studies of these organisms were undertaken. For the best-characterized genus, *Dictyostelium*, nine species were found to be common inhabitants of the upper soil and leaf litter layers in the forests of North America (Cavender J C, Raper K B. (1965) The Acrasieae in nature. I. Isolation. Am J Bot 52: 294-6). Since the publication of these early studies, it has been shown that the Dictyostelids occur worldwide in a variety of soil environments (Swanson A, Vadell E, Cavender J. (2001) Global distribution of forest soil dictyostelids J Biogeo 26(1): 133-48). Collectively, the ecological studies suggest that amoebae are truly cosmopolitan both with regard to their geographic distribution and ecological niches.

The ability of slime molds to feed on bacteria and fungi is described (Raper K B. 1984. The Dictyostelids. Princeton University Press. Princeton N.J.; Old, K. M. et al., .1985 Fine structure of a new mycophagous amoeba and its feeding on *Cochliobolus sativus*; S. Chakraborty, et al., 1985, Canadian J. of Microb, 31:295-297; Soil Biology and Biochemistry Vol 17, 645-655; A Duczek, LJ % A Wildermuth, G B 1991 J Australasian Plant Pathology Vol 20, 81-85). When a few spores are added to bacteria growing on a plate, in a matter of hours they split open (germinate) and from each spore emerges a single amoeba that immediately begins to feed on the surrounding bacteria. As they grow, they divide into two (e.g., approximately every three hours) so vast numbers of amoebae are soon present. The soil-born amoebae feed first as independent amoebae. Each individual amoeba surrounds a bacterium (or other microorganism) with its pseudopods, encases it in a food vacuole, and extracts the needed nutrients. Thus, amoebae can be viewed as professional phagocytes that are similar to macrophages and neutrophils (Chen G, et al. 2007. Science. 317:678-68). Mechanistically, both amoebae and the immune cells capture bacteria by phagocytosis within cytoplasmic vesicles. These vesicles fuse with lysosomes as a step in the killing of entrapped bacteria. Once amoebae clean an area of bacteria, they then come together and aggregate to form a unit similar to a multi-cellular organism. During the social cycle, thousands of amoebae aggregate in tune to a camp signal and the aggregated cells can form a slug. Ultimately the slug develops into spore-laden fruiting bodies.

The social amoebae belonging to the phylum Mycetozoa have been described as primitive eukaryotes that exhibit characteristics found among both protozoans and fungi (Bonner J T. (2009); Raper K B, Rahn A W. (1984) The Dictyostelids). This description can be summarized in an illustration of their asexual life cycle. Each species of amoeba has a vegetative phase where, as microscopic independent amoeboid cells feed upon bacteria, grow, and multiply. When the amoebae exhaust their bacterial food source, they enter a social phase in which individual cells stream together to form a multicellular, differentiated, assemblage (in a phylogenetic group 4 of Dictyostelids (Sheikh S., Thulin, M Cavender, J C. Escalante, R., Kawakami, S, et al. (2017). "A new Classification of the Dictyostelids." Protist mobile slug. Since growth occurs at the single-cell stage, its size depends on how many amoebae have entered the aggregate, and slugs will vary in length from about 0.2 to 2 millimeters, a ten-fold range, and by the latest estimates the number of amoebae they contain ranges from about 10,000 to 2 million. The slug eventually comes to rest and develops into a macroscopic fruiting body consisting of a stalk with sorocarp. Within the sorocarp are environmentally and temporally stable spores, which are disseminated by the wind, animals, or the forces generated by the sorocarp falling. From each viable spore a single amoeba arises.

Unlike animals or plants, amoebae eat first; then grow by simply producing an increasing number of separate amoebae, and when food (bacteria/fungi) is gone they stream together to become multi-cellular. Once amoebae form their fruiting bodies they can no longer do anything that requires an intake of energy: they are static. The only part of them that is alive is the dormant spores.

In addition to their feeding behavior, amoebae possess many other virtues that are conducive to an amoebic antimicrobial treatment: Most prominent virtues of this group of organisms have been studied and extensively described for

*Dictyostelium discoideum.* Although the below discussion in exemplified by *D. discoideum*, the present disclosure is not limited to a particular strain of Dictyostelid amoeba.

*D. discoideum* amoebae and spores themselves are not known to be pathogenic to animals and plants. *D. discoideum* consumes and digests a variety of pathogenic and non-pathogenic bacteria, whether live, dormant or dead. Moreover, bacteria that are resistant to conventional antibiotics are consumed by *D. discoideum* (See e.g., Smith M G, et al. 2007. Genes Dev. 21:601-614). *D. discoideum* not only kills free bacteria, but can consume bacteria living as a colony or biofilm (Raper K B. 1984. The Dictyostelids. Princeton University Press. Princeton N.J.; Sanders, D., et al. (2017). "Multiple Dictyostelid Species Destroy Biofilms of *Klebsiella oxytoca* and Other Gram Negative Species." *Protist* 168(3): 311-325.). Thus, slime molds further find use in controlling microbial biofilms (Sanders, D., et al. (2017). "Multiple Dictyostelid Species Destroy Biofilms of *Klebsiella oxytoca* and Other Gram Negative Species." *Protist* 168(3): 311-325). As a eukaryotic organism, *D. discoideum* amoeba is not susceptible to anti-prokaryotic antibiotics. Therefore, amoebae can be used in conjunction with most of the antibiotics used to treat bacterial infections.

In some embodiments, amoebic treatment utilizes overwhelming numbers of amoebae. Locally, these amoebae quickly ingest and digest their bacterial prey. The present disclosure is not limited to a particular mechanism. Indeed, an understanding of the mechanism is not necessary to practice the present disclosure. Nonetheless, it is contemplated that in the time frame of treatment, resistance to amoebae will be difficult for pathogens to acquire, and spread of resistance will be minimized. Certain bacteria are facultative intracellular pathogens and there are known strain of genetically engineered bacteria, like the benign soil bacterium *Bacillus subtilis* harboring the gene for lysteriolysin O, can survive within macrophage-like cell line (Bielecki J, et al. 1990. Nature, 345:175-176). However, in combination with more than one amoebae type or in combination with conventional antibiotics, resistance to amoebic therapy can be minimized or eliminated.

As described above, embodiments of the present disclosure provide compositions and methods for treating infection by microorganisms with amoebae. Examples of amoebae suitable for use in embodiments of the present disclosure include, but are not limited to, amoebae of the phylum Mycetozoa, which include but are not limited to: *DICTYOSTELIUM: D. laterosorum, D. tenue, D. potamoides, D. minutum, D. gracile, D. lavandulum, D. vinaceo-fuscum, D. rhizopodium, D. coeruleo-stipes, D. lacteum, D. polycephalum, D. polycarpum, D. polycarpum, D. menorah, D. caveatum, D. gloeosporum, D. oculare, D. antarcticum, D. fasciculatum, D. delicatum, D. fasciculatum, D. aureo-stipes* var. *helveticum, D. granulophorum, D. medusoides, D. mexicanum, D. bifurcatum, D. stellatum, D. microsporum, D. parvisporum, D. exiguum* TNS-C-199, *D. mucoroides, D. sphaerocephalum, D. rosarium, D. clavatum, D. longosporum, D. macrocephalum, D. discoideum, D. discoideum* AX4, *D. intermedium, D. firmibasis, D. brunneum, D. giganteum, D. robustum, D. multi-stipes, Dermamoeba algensis, D. brefeldianum, D. mucoroides, D. capitatum, D. pseudobrefeldianum, D. aureocephalum, D. aureum, D. septentrionalis, D. septentrionalis, D. implicatum, D. medium, D. sphaerocephalum, D. rosarium, D. clavatum, D. longosporum, D. purpureum, D. macrocephalum, D. citrinum, D. dimigraformum, D. firmibasis, D. brunneum, D. giganteum, D. monochasioides, Thecamoeba similis* and *POLYSPHONDYLIUM: P. violaceum, P. filamentosum, P. luridum, P. pallidum, P. equisetoides, P. nandutensis* YA, *P. colligatum, P. tikaliensis, P. anisocaule, P. pseudocandidum, P. tenuissimum, P. pallidum, P. asymmetricum, P. filamentosum, P. tenuissimum, P. candidum. ACYTOSTELIUM; A. ellipticum, A. anastomosans, A. longisorophorum, A. leptosomum, A. digitatum, A. serpentarium, A. subglobosum, A. irregularosporum. ACRASIDE; A. granulate, A. rosea; COPROMYXA: C. protea, C. arborescens, C. filamentosa,* and *C. corralloides; GUTTULINA* (Pocheina) *G. rosea; GUTTULINOPSIS G. vulgaris, G. clavata, G. stipitata, G. nivea* (See e.g., Schaap, et al. 2006 Molecular Phylogeny and Evolution of Morphology in the Social Amoebas, Science 27 Oct. 2006: 661-663; Raper K B. 1984. The Dictyostelids. Princeton University Press. Princeton N.J.; each of which is herein incorporated by reference in its entirety).

In some embodiments, the amoebae are specific strains of *Dictyostelium* sp. selected for their ability to target bacteria that cause soft rot at storage temperatures of potatoes. Examples include, but are not limited to, Cohen 35, Cohen 36, Cohen 8, Cohen 9, Couch C1, DC-6, DC-61, DC-7, WS-116d (See e.g., Nickerson, K B Raper American Journal of Botany, 1973; herein incorporated by reference in its entirety), WS-15, WS-20, WS-517, WS-588 (See e.g., Erdos et al., Proceedings of the National Academy of Sciences (PNAS) 1975; herein incorporated by reference in its entirety), WS-606 (See e.g., Erdos et al., Proceedings of the National Academy of Sciences (PNAS) 1975; herein incorporated by reference in its entirety), WS-647 (See e.g., Sanders et al., Protist 2017; herein incorporated by reference in its entirety), WS-666, WS-669, WS-69, WS-269a (See e.g., Konijn, K B Raper Developmental Biology—1961; herein incorporated by reference in its entirety, WS-269b, WS-380b (See e.g., Erdos, et al., PNAS 1973; herein incorporated by reference in its entirety), WS-462, Maryland 5a, or Za-2a (See e.g., Nickerson, K B Raper American Journal of Botany, 1973; herein incorporated by reference in its entirety). In some embodiments, the amoebae are one or more of Cohen 36, WS-69, and/or Cohen 9.

In some embodiments, the strains are one or more of BAC10A, BAF6A, BAC3A, NW2, KB4A (ATCC® MYA-4262™), SO8B, SO3A, BAF9B, IC2A (ATCC® MYA-4259™), AK1A1 (ATCC® MYA-4272™), PBF4B (ATCC® MYA-4263), PBF8B, BSB1A, SO5B (ATCC® MYA-4249), PBF3C, PBF6B, NW2B (See e.g., Romeralo et al., Mycologia 2010 and Sanea Sheikh et al. Protist 2018; each of which is herein incorporated by reference in its entirety), NW10B (ATCC® MYA-4271™), PBF9A, IC5A (ATCC® MYA-4256™), ABC8A (ATCC® MYA-4260), NW16B, ABC10B, ABB6B (ATCC® MYA-4261), BA4A (ATCC® MYA-4252), AKKSA, AKK52C, HP4 (ATCC® MYA-4286), HP8 (ATCC® MYA-4284), or NW9A.

In some embodiments, amoebae are stored and/or transported in the spore stage of the life cycle. *D. discoideum* forms easily germinated temperature-, environment-, and temporally-stable spores. In the absence of a bacterial food supply, essential amino acids become limiting, and *D. discoideum* sporulates. Spores have been shown to remain viable, without refrigeration, for over 70 years when lyophilized, for shorter times they can be stored in silica gel. When nutrients are available, spores germinate in 6-10 hours to produce amoebae. Spores can be exploited as a means of transport and storage of amoebae used in agricultural and industrial treatments.

In some embodiments, the present disclosure provides kits and/or compositions comprising amoebae. In some embodiments, amoebae are in a form (e.g., spores) that, as noted, is stable for long term storage. In some embodiments, the amoebae are present at a concentration of $1 \times 10^6$ to $1 \times 10^8$ spores/mL, although other concentrations are specifically contemplated.

In other embodiments, amoebae are stored and transported in different stages. In some embodiments, compositions comprise additional components (e.g., storage reagents, buffers, preservatives, stabilizers, etc.). In some embodiments, amoeba or spores are stored or transported at −80° C. in 10% Dimethyl sulfoxide (DMSO) or 10% glycerol, in the SM2 medium comprising the following: peptone 10 g, dextrose 10 g, $Na_2HPO_{4 \times 12} H_2O$ 1 g, $KH_2PO_4$ 1.5 g, $MgSO_4$ 0.5 g, per 1 L, 1 g yeast extract (Raper 1984). In other embodiments, amoebae or spores are stored short-term at 4° C. in medium SM2 solidified with 10 g of agar per L.

Another method of long-term storage of spores is lyophilization. In some embodiments, the present disclosure provides lyophilized amoebae. In some embodiments, amoebae are lyophilized in the presence of stabilization agents such as for example, a buffer (e.g., a non-fat skim milk buffer) and/or a stabilizer (e.g., polysaccharide). In some embodiments, the rate of freezing is optimized (e.g., as described in the experimental section below) in order to promote spore viability.

In some embodiments, compositions are provided as wettable powder comprising lyophilized amoebae and optionally stabilizers (e.g., those described herein). Such wettable powders are designed to be rehydrated to a spray, dip, or mist at the time of use (e.g., as described below). In some embodiments, the composition is provided as a ready to use dip, mist or spray.

In some embodiments, lyophilized spores (e.g., provided as a wettable powder or other formulation) are rehydrated in order to promote germination of spores. For example, in some embodiments, spores are rehydrated in peptone and/or using heat shock. In some embodiments, rehydration is designed for rapid gemination of approximately half of the spores, while the other half remain dormant to quickly respond to future bacterial growth.

In some embodiments, compositions for use in killing microorganisms utilize two or more distinct species of amoebae (e.g., with different bacterial specificities).

In some embodiments, one or more amoebae are administered in combination with known anti-microbial agents. For example, in some embodiments, the agents are pesticides, fungicides, herbicides, fertilizers, or insecticides, depending on the time of application. In some embodiments, compositions comprise a fungicide.

Examples of fungicides include, but are not limited to, Regalia® biofungicide, aliphatic nitrogen fungicides (e.g., butylamine, cymoxanil, dodicin, dodine, guazatine, iminoctadine); amide fungicides (e.g., carpropamid, chloraniformethan, cyflufenamid, diclocymet, ethaboxam, fenoxanil, flumetover, furametpyr, isopyrazam, mandipropamid, penthiopyrad, prochloraz, quinazamid, silthiofam, triforine, xiwojunan); acylamino acid fungicides (e.g., benalaxyl (e.g., benalaxyl-M), furalaxyl, metalaxyl (e.g., metalaxyl-M), pefurazoate, valifenalate); anilide fungicides (e.g., benalaxyl (e.g., benalaxyl-M), bixafen, boscalid, carboxin, fenhexamid, fluxapyroxad, isotianil, metalaxyl (e.g., metalaxyl-M), metsulfovax, ofurace, oxadixyl, oxycarboxin, penflufen, pyracarbolid, sedaxane, thifluzamide, tiadinil, vangard); benzanilide fungicides (e.g., benodanil, flutolanil, mebenil, mepronil, salicylanilide, tecloftalam); furanilide fungicides (e.g., fenfuram, furalaxyl, furcarbanil, methfuroxam); sulfonanilide fungicides (e.g., flusulfamide); benzamide fungicides (e.g., benzohydroxamic acid, fluopicolide, fluopyram, tioxymid, trichlamide, zarilamid, zoxamide); furamide fungicides (e.g., cyclafuramid, furmecyclox); phenylsulfamide fungicides (e.g., dichlofluanid, tolylfluanid); sulfonamide fungicides (e.g., amisulbrom, cyazofamid); valinamide fungicides (e.g., benthiavalicarb, iprovalicarb); antibiotic fungicides (e.g., aureofungin, blasticidin-S, cycloheximide, griseofulvin, kasugamycin, moroxydine, natamycin, polyoxins, polyoxorim, streptomycin, validamycin); aromatic fungicides (e.g., biphenyl, chlorodinitronaphthalenes, chloroneb, chlorothalonil, cresol, dicloran, hexachlorobenzene, pentachlorophenol, quintozene, sodium pentachlorophenoxide, tecnazene); arsenical fungicides (e.g., asomate, urbacide); aryl phenyl ketone fungicides (e.g., metrafenone, pyriofenone); benzimidazole fungicides (e.g., benomyl carbendazim, chlorfenazole, cypendazole, debacarb, fuberidazole, mecarbinzid, rabenzazole, thiabendazole); benzimidazole precursor fungicides (e.g., furophanate, thiophanate, thiophanate-methyl); benzothiazole fungicides (e.g., bentaluron, benthiavalicarb, benthiazole, chlobenthiazone, probenazole); botanical fungicides (e.g., allicin, berberine, carvacrol, carvone, osthol); bridged diphenyl fungicides (e.g., bithionol, dichlorophen, diphenylamine, hexachlorophene, parinol); carbamate fungicides (e.g., benthiavalicarb, furophanate, iprovalicarb, propamocarb, pyribencarb, thiophanate, thiophanate-methyl); benzimidazolylcarbamate fungicides (e.g., benomyl, carbendazim, cypendazole, debacarb, mecarbinzid); carbanilate fungicides (e.g., diethofencarb, lvdingjunzhi, pyraclostrobin, pyrametostrobin); conazole fungicides (e.g., conazole fungicides (imidazoles) (e.g., climbazole, clotrimazole, imazalil, oxpoconazole, prochloraz, triflumizole, see also imidazole fungicides), conazole fungicides (triazoles) (e.g., azaconazole, bromuconazole, cyproconazole, diclobutrazol, difenoconazole, diniconazole (e.g., diniconazole-M), epoxiconazole, etaconazole, fenbuconazole, fluquinconazole, flusilazole, flutriafol, furconazole (e.g., furconazole-cis), hexaconazole, imibenconazole, ipconazole, metconazole, myclobutanil, penconazole, propiconazole, prothioconazole, quinconazole, simeconazole, tebuconazole, tetraconazole, triadimefon, triadimenol, triticonazole, uniconazole, uniconazole-P, see also triazole fungicides)); copper fungicides (e.g., Bordeaux mixture, Burgundy mixture, Cheshunt mixture, copper acetate, copper carbonate, basic copper hydroxide, copper naphthenate, copper oleate, copper oxychloride, copper silicate, copper sulfate, copper sulfate, basic, copper zinc chromate, cufraneb, cuprobam, cuprous oxide, mancopper, oxine-copper, saisentong); cyanoacrylate fungicides (e.g., benzamacril, phenamacril); dicarboximide fungicides (e.g., famoxadone, fluoroimide); dichlorophenyl dicarboximide fungicides (e.g., chlozolinate, dichlozoline, iprodione, isovaledione, myclozolin, procymidone, vinclozolin); phthalimide fungicides (e.g., captafol, captan, ditalimfos, folpet, thiochlorfenphim); dinitrophenol fungicides (e.g., binapacryl, dinobuton, dinocap (e.g., dinocap-4, dinocap-6, meptyldinocap), dinocton, dinopenton, dinosulfon, dinoterbon, DNOC); dithiocarbamate fungicides (e.g., amobam, asomate, azithiram, carbamorph, cufraneb, cuprobam, disulfiram, ferbam, metam, nabam, tecoram, thiram, urbacide, ziram); cyclic dithiocarbamate fungicides (e.g., dazomet, etem, milneb); polymeric dithiocarbamate fungicides (e.g., mancopper, mancozeb, maneb, metiram, polycarbamate, propineb, zineb); dithiolane fungicides (e.g., isoprothiolane, saijunmao); fumigant fungicides (e.g., dithioether, methyl bromide); hydrazide fungicides (e.g., benquinox, saijunmao); imidazole fungicides (e.g., cyazofamid, fenamidone, fenapanil, glyodin, iprodione, isovaledione, pefurazoate, triazoxide, see also conazole fungicides (imidazoles)); inorganic fungicides (e.g., potassium azide, potassium thiocyanate, sodium azide, sulfur, see also copper fungicides, see also inorganic mercury fungicides); mercury fungicides (e.g., inorganic mercury fungicides (e.g., mercuric chloride, mercuric oxide, mercurous chloride), organomercury fungicides (e.g., (3-ethoxypropyl)mercury bromide, ethylmercury acetate, ethylmercury bromide, ethylmercury chloride, ethylmercury 2,3-dihydroxypropyl mercaptide, ethylmercury phosphate, N-(ethylmercury)-ptoluenesulphonanilide, hydrargaphen, 2-methoxyethylmercury chloride, methylmercury benzoate, methylmercury dicyandiamide, methylmercury pentachlorophenoxide, 8-phenylmercurioxyquinoline, phenylmercuriurea, phenylmercury acetate, phenylmercury chloride, phenylmercury derivative of pyrocatechol, phenylmercury nitrate, phenylmercury salicylate, thiomersal, tolylmercury acetate)); morpholine fungicides (e.g., aldimorph, benzamorf, carbamorph, dimethomorph, dodemorph, fenpropimorph, flumorph, tridemorph); organophosphorus fungicides (e.g., ampropylfos, ditalimfos, EBP, edifenphos, fosetyl, hexylthiofos, inezin, iprobenfos, izopamfos, phosdiphen, pyrazophos, tolclofos-methyl, triamiphos); organotin fungicides (e.g., decafentin, fentin, tributyltin oxide); oxathiin fungicides (e.g., carboxin, oxycarboxin); oxazole fungicides (e.g., dichlozoline, dingjunezuo, drazoxolon, famoxadone, hymexazol, metazoxolon, myclozolin, oxadixyl, vinclozolin); paclobutrazole; polysulfide fungicides (e.g., barium polysulfide, calcium polysulfide, potassium polysulfide, sodium polysulfide); pyrazole fungicides (e.g., bixafen, fluxapyroxad, furametpyr, isopyrazam, penflufen, penthiopyrad, pyraclostrobin, pyrametostrobin, pyraoxystrobin, rabenzazole, sedaxane); pyridine fungicides (e.g., boscalid, buthiobate, dingjunezuo, dipyrithione, fluazinam, fluopicolide, fluopyram, lvdingjunzhi, parinol, pyribencarb, pyridinitril, pyrifenox, pyroxychlor, pyroxyfur); pyrimidine fungicides (e.g., bupirimate, diflumetorim, dimethirimol, ethirimol, fenarimol, ferimzone, nuarimol, triarimol); anilinopyrimidine fungicides (e.g., cyprodinil, mepanipyrim, pyrimethanil); pyrrole fungicides (e.g., dimetachlone, fenpiclonil, fludioxonil, fluoroimide); quinoline fungicides (e.g., ethoxyquin, halacrinate, 8-hydroxyquinoline sulfate, quinacetol, quinoxyfen, tebufloquin); quinone fungicides (e.g., benquinox, chloranil, dichlone, dithianon); quinoxaline fungicides (e.g., chinomethionat, chlorquinox, thioquinox); thiazole fungicides (e.g., ethaboxam, etridiazole, isotianil, metsulfovax, octhilinone, thiabendazole, thifluzamide); thiazolidine fungicides (e.g., flutianil, thiadifluor); thiocarbamate fungicides (e.g., methasulfocarb, prothiocarb); thiophene fungicides (e.g., ethaboxam, silthiofam); triazine fungicides (e.g., anilazine); triazole fungicides (e.g., amisulbrom, bitertanol, fluotrimazole, huanjunzuo, triazbutil, see also conazole fungicides (triazoles)); triazolopyrimidine fungicides (e.g., ametoctradin); urea fungicides (e.g., bentaluron, pencycuron, quinazamid); unclassified fungicides (e.g., acibenzolar, acypetacs, allyl alcohol, benzalkonium chloride, bethoxazin, bromothalonil, chloropicrin, DBCP, dehydroacetic acid, diclomezine, diethyl pyrocarbonate, ethylicin, fenaminosulf, fenitropan, fenpropidin, formaldehyde, furfural, hexachlorobutadiene, methyl iodide, methyl isothiocyanate, nitrostyrene, nitrothal-isopropyl, OCH, 2-phenylphenol, phthalide, piperalin, propamidine, proquinazid, pyroquilon, sodium orthophenylphenoxide, spiroxamine, sultropen, thicyofen, tricyclazole, zinc naphthenate); or a strobilurin or strobilurin derivative.

Examples of insecticides include, but are not limited to, antibiotic insecticides (e.g., allosamidin, thuringiensin); macrocyclic lactone insecticides (e.g., avermectin insecticides (e.g., abamectin, doramectin, emamectin, eprinomectin, ivermectin, selamectin), milbemycin insecticides (e.g., lepimectin, milbemectin, milbemycin oxime, and moxidectin), spinosyn insecticides (e.g., spinetoram and spinosad)); arsenical insecticides (e.g., calcium arsenate, copper acetoarsenite, copper arsenate, lead arsenate, potassium arsenite, sodium arsenite); botanical insecticides (e.g., allicin, anabasine, azadirachtin, carvacrol, d-limonene, matrine, nicotine, nornicotine, oxymatrine, pyrethrins (e.g., cinerins, (e.g., cinerin I, cinerin II), jasmolin I, jasmolin II, pyrethrin I, pyrethrin II), quassia, rhodojaponin-III, rotenone, ryania, sabadilla, triptolide); carbamate insecticides (e.g., bendiocarb, carbaryl); benzofuranyl methylcarbamate insecticides (e.g., benfuracarb, carbofuran, carbosulfan, decarbofuran, furathiocarb); dimethylcarbamate insecticides (e.g., dimetan, dimetilan, hyquincarb, isolan, pirimicarb, pyramat); oxime carbamate insecticides (e.g., alanycarb, aldicarb, aldoxycarb, butocarboxim, butoxycarboxim, methomyl, nitrilacarb, oxamyl, tazimcarb, thiocarboxime, thiodicarb, thiofanox); phenyl methylcarbamate insecticides (e.g., allyxycarb, aminocarb, bufencarb, butacarb, carbanolate, cloethocarb, CPMC, dicresyl, dimethacarb, dioxacarb, EMPC, ethiofencarb, fenethacarb, fenobucarb, isoprocarb, methiocarb, metolcarb, mexacarbate, promacyl, promecarb, propoxur, trimethacarb, XMC, xylylcarb); desiccant insecticides (e.g., boric acid, diatomaceous earth, silica gel); diamide insecticides (e.g., chlorantraniliprole, cyantraniliprole, flubendiamide); dinitrophenol insecticides (e.g., dinex, dinoprop, dinosam, DNOC); fluorine insecticides (e.g., barium hexafluorosilicate, cryolite, flursulamid, sodium fluoride, sodium hexafluorosilicate, sulfluramid); formamidine insecticides (e.g., amitraz, chlordimeform, formetanate, formparanate, medimeform, semiamitraz); fumigant insecticides (e.g., acrylonitrile, carbon disulfide, carbon tetrachloride, chloroform, chloropicrin, paradichlorobenzene, 1,2-dichloropropane, dithioether, ethyl formate, ethylene dibromide, ethylene dichloride, ethylene oxide, hydrogen cyanide, methyl bromide, methyl iodide, methylchloroform, methylene chloride, naphthalene, phosphine, sulfuryl fluoride, tetrachloroethane); inorganic insecticides (e.g., borax, boric acid, calcium polysulfide, copper oleate, diatomaceous earth, mercurous chloride, potassium thiocyanate, silica gel, sodium thiocyanate, see also arsenical insecticides, see also fluorine insecticides); insect growth regulators (e.g., chitin synthesis inhibitors (e.g., bistrifluron, buprofezin, chlorbenzuron, chlorfluazuron, cyromazine, dichlorbenzuron, diflubenzuron, flucycloxuron, flufenoxuron, hexaflumuron, lufenuron, novaluron, noviflumuron, penfluron, teflubenzuron, triflumuron); juvenile hormone mimics (e.g., dayoutong, epofenonane, fenoxycarb, hydroprene, kinoprene, methoprene, pyriproxyfen, triprene); juvenile hormones (e.g., juvenile hormone I, juvenile hormone II, juvenile hormone III); moulting hormone agonists (e.g., chromafenozide, furan tebufenozide, halofenozide, methoxyfenozide, tebufenozide, yishijing); moulting hormones (e.g., a-ecdysone, ecdysterone); moulting inhibitors (e.g., diofenolan); precocenes (e.g., precocene I, precocene II, precocene III); unclassified insect growth regulators (e.g., dicyclanil)); nereistoxin analogue insecticides (e.g., bensultap, cartap, polythialan, thiocyclam, thiosultap); nicotinoid insecticides (e.g., flonicamid); nitroguanidine insecticides (e.g., clothianidin, dinotefuran, imidacloprid, imidaclothiz, thiamethoxam); nitromethylene insecticides (e.g., nitenpyram, nithiazine); pyridylmethylamine insecticides (e.g., acetamiprid, imidacloprid, nitenpyram, paichongding, thiacloprid); organochlorine insecticides (e.g., bromo-DDT, camphechlor, DDT (e.g., pp'-DDT), ethyl-DDD, HCH (e.g., gamma-HCH, lindane), methoxychlor, pentachlorophenol, TDE); cyclodiene insecticides (e.g., aldrin, bromocyclen, chlorbicyclen, chlordane, chlordecone, dieldrin, dilor, endosulfan (e.g., alpha endosulfan), endrin, HEOD heptachlor, HHDN, isobenzan, isodrin, kelevan, mirex), organophosphorus insecticides (e.g., organophosphate insecticides (e.g., bromfenvinfos, calvinphos, chlorfenvinphos, crotoxyphos, dichlorvos, dicrotophos, dimethylvinphos, fospirate, heptenophos, methocrotophos, mevinphos monocrotophos, naled, naftalofos, phosphamidon, propaphos, TEPP, tetrachlorvinphos); organothiophosphate insecticides (e.g., dioxabenzofos, fosmethilan, phenthoate); aliphatic organothiophosphate insecticides (e.g., acethion, acetophos, amiton, cadusafos, chlorethoxyfos, chlormephos, demephion (e.g., demephion-O, demephion-S), demeton (e.g., demeton-O, demeton-S), demeton methyl (e.g., demeton-O-methyl, demeton-S-methyl), disulfoton, ethion ethoprophos, IPSP, isothioate, malathion, methacrifos, methylacetophos, oxydemetonmethyl, oxydeprofos, oxydisulfoton, phorate, sulfotep, terbufos, thiometon); aliphatic amide organothiophosphate insecticides (e.g., amidithion, cyanthoate, dimethoate, ethoate-methyl, formothion, mecarbam, omethoate, prothoate, sophamide, vamidothion), oxime organothiophosphate insecticides (e.g., chlorphoxim, phoxim, phoximmethyl); heterocyclic organothiophosphate insecticides (e.g., azamethiphos, colophonate, coumaphos, coumithoate, dioxathion, endothion, menazon, morphothion, phosalone, pyraclofos, pyridaphenthion, quinothion); benzothiopyran organothiophosphate insecticides (e.g., dithicrofos, thicrofos); benzotriazine organothiophosphate insecticides (e.g., azinphos-ethyl, azinphos-methyl); isoindole organothiophosphate insecticides (e.g., dialifos, phosmet); isoxazole organothiophosphate insecticides (e.g., isoxathion, zolaprofos); pyrazolopyrimidine organothiophosphate insecticides (e.g., chlorprazophos, pyrazophos); pyridine organothiophosphate insecticides (e.g., chlorpyrifos, chlorpyrifos-methyl); pyrimidine organothiophosphate insecticides (e.g., butathiofos, diazinon, etrimfos, lirimfos, pirimioxyphos pirimiphos-ethyl, pirimiphos-methyl, primidophos, pyrimitate, tebupirimfos); thiadiazole organothiophosphate insecticides (e.g., athidathion, lythidathion, methidathion, prothidathion); triazole organothiophosphate insecticides (e.g., isazofos, triazophos); phenyl organothiophosphate insecticides (e.g., azothoate, bromophos, bromophos-ethyl, carbophenothion, chlorthiophos, cyanophos, cythioate, dicapthon, dichlofenthion, etaphos, famphur, fenchlorphos, fenitrothion, fensulfothion, fenthion, fenthion-ethyl, heterophos, jodfenphos, mesulfenfos, parathion, parathion-methyl, phenkapton, phosnichlor, profenofos, prothiofos, sulprofos, temephos, trichlormetaphos-3, trifenofos, xiaochongliulin)); phosphonate insecticides (e.g., butonate, trichlorfon); phosphonothioate insecticides (e.g., mecarphon); phenyl ethylphosphonothioate insecticides (e.g., fonofos, trichloronat); phenyl phenylphosphonothioate insecticides (e.g., cyanofenphos, EPN, leptophos); phosphoramidate insecticides (e.g., crufomate, fenamiphos, fosthietan, mephosfolan, phosfolan, phosfolan-methyl pirimetaphos); phosphoramidothioate insecticides (e.g., dimefox, mazidox, mipafox, schradan); oxadiazine insecticides (e.g., indoxacarb); oxadiazolone insecticides (e.g., metoxadiazone); phthalimide insecticides (e.g., dialifos, phosmet, tetramethrin); pyrazole insecticides (e.g., chlorantraniliprole, cyantraniliprole, dimetilan, isolan, tebufenpyrad, tolfenpyrad); phenylpyrazole insecticides (e.g., acetoprole, ethiprole, fipronil, pyraclofos, pyrafluprole, pyriprole, vaniliprole); pyrethroid insecticides (e.g., pyrethroid ester insecticides (e.g., acrinathrin, allethrin (e.g., bioallethrin, esdepallethrine), barthrin, bifenthrin, bioethanomethrin brofenvalerate, brofluthrinate, bromethrin, butethrin, chlorempenthrin, cyclethrin, cycloprothrin cyfluthrin (e.g., beta-cyfluthrin), cyhalothrin (e.g., gamma-cyhalothrin, lambda-cyhalothrin), cypermethrin (e.g., alpha-cypermethrin, beta-cypermethrin, theta-cypermethrin, zeta-cypermethrin), cyphenothrin, deltamethrin, dimefluthrin, dimethrin, empenthrin, d-fanshiluquebingjuzhi, fenfluthrin, fenpirithrin, fenpropathrin, fenvalerate (e.g., esfenvalerate), flucythrinate, fluvalinate (e.g., tau fluvalinate), furamethrin, furethrin, imiprothrin, japothrins, kadethrin, meperfluthrin, methothrin, metofluthrin, pentmethrin, permethrin (e.g., biopermethrin, transpermethrin), phenothrin, prallethrin, profluthrin, proparthrin, pyresmethrin, resmethrin (e.g., bioresmethrin, cismethrin), tefluthrin, terallethrin, tetramethrin, tetramethylfluthrin, tralocythrin, tralomethrin, transfluthrin, valerate; pyrethroid ether insecticides (e.g., etofenprox, flufenprox, halfenprox, protrifenbute, silafluofen); pyrethroid oxime insecticides (e.g., sulfoxime, thiofluoximate)); pyrimidinamine insecticides (e.g., flufenerim, pyrimidifen); pyrrole insecticides (e.g., chlorfenapyr); tetramic acid insecticides (e.g., spirotetramat); tetronic acid insecticides (e.g., spiromesifen); thiazole insecticides (e.g., clothianidin, imidaclothiz, thiamethoxam, thiapronil); thiazolidine insecticides (e.g., tazimcarb, thiacloprid); thiourea insecticides (e.g., diafenthiuron); urea insecticides (e.g., flucofuron, sulcofuron, see also chitin synthesis inhibitors); unclassified insecticides (e.g., closantel, copper naphthenate, crotamiton EXD, fenazaflor, fenoxacrim, hydramethylnon, isoprothiolane malonoben, metaflumizone,nifluridide, plifenate, pyridaben, pyridalyl, pyrifluquinazon, rafoxanide, sulfoxaflor, triarathene, triazamate).

Examples of pesticides include, but are not limited to, acaricides, avicides, chemosterilants, herbicides, insecticides, molluscicides, plant growth regulators, virucides, algicides, bactericides, fungicides, insect attractants, mammal repellents, nematicides, rodenticides, antifeedants, bird repellents, herbicide safeners, insect repellents, mating disrupters, plant activators, synergists, chemical classes, and miscellaneous.

The present disclosure is not limited to a particular herbicide. Examples include, but are not limited to, amide herbicides (e.g., allidochlor, amicarbazone, beflubutamid, benzadox, benzipram, bromobutide, cafenstrole, CDEA, cyprazole, dimethenamid (e.g., dimethenamid-P), diphenamid, epronaz, etnipromid, fentrazamide, flucarbazone, flupoxam, fomesafen, halosafen, huangcaoling, isocarbamid, isoxaben, napropamide, naptalam, pethoxamid, propyzamide, quinonamid, saflufenacil, tebutam); anilide herbicides (e.g., chloranocryl, cisanilide, clomeprop, cypromid, diflufenican, erlujixiancaoan, etobenzanid, fenasulam, flufenacet, flufenican, ipfencarbazone, mefenacet, mefluidide, metamifop, monalide, naproanilide, pentanochlor, picolinafen, propanil, sulfentrazone); arylalanine herbicides (e.g., benzoylprop, flamprop (e.g., flamprop-M)); chloroacetanilide herbicides (e.g., acetochlor, alachlor, butachlor, butenachlor, delachlor, diethatyl, dimethachlor, ethachlor, ethaprochlor, metazachlor, metolachlor (e.g., S-metolachlor), pretilachlor, propachlor, propisochlor, prynachlor, terbuchlor, thenylchlor, xylachlor); sulfonanilide herbicides (e.g., benzofluor, cloransulam, diclosulam, florasulam, flumetsulam, metosulam, perfluidone, pyrimisulfan, profluazol); sulfonamide herbicides (e.g., asulam, carbasulam, fenasulam, oryzalin, penoxsulam, pyroxsulam, see also sulfonylurea herbicides); thioamide herbicides (e.g., bencarbazone, chlorthiamid); antibiotic herbicides (e.g., bilanafos); aromatic acid herbicides (e.g., benzoic acid herbicides (e.g., chloramben, dicamba, 2,3,6-TBA, tricamba); pyrimidinyloxybenzoic acid herbicides (e.g., bispyribac, pyriminobac); pyrimidinylthiobenzoic acid herbicides (e.g., pyrithiobac); phthalic acid herbicides (e.g., chlorthal); picolinic acid herbicides (e.g., aminopyralid, clopyralid, picloram); quinolinecarboxylic acid herbicides (e.g., quinclorac, quinmerac)); arsenical herbicides (e.g., cacodylic acid, CMA, DSMA, hexaflurate, MAA, MAMA, MSMA, potassium arsenite, sodium arsenite); benzoylcyclohexanedione herbicides (e.g., ketospiradox, mesotrione, sulcotrione, tefuryltrione, tembotrione); benzofuranyl alkylsulfonate herbicides (e.g., benfuresate, ethofumesate); benzothiazole herbicides (e.g., benazolin, benzthiazuron, fenthiaprop, mefenacet, methabenzthiazuron); carbamate herbicides (e.g., asulam, carboxazole, chlorprocarb, dichlormate, fenasulam, karbutilate, terbucarb); carbanilate herbicides (e.g., barban, BCPC, carbasulam, carbetamide, CEPC, chlorbufam, chlorpropham, CPPC, desmedipham, phenisopham, phenmedipham, phenmedipham-ethyl, propham, swep); cyclohexene oxime herbicides (e.g., alloxydim, butroxydim, clethodim, cloproxydim, cycloxydim, profoxydim, sethoxydim, tepraloxydim, tralkoxydim); cyclopropylisoxazole herbicides (e.g., isoxachlortole, isoxaflutole); dicarboximide herbicides (e.g., cinidon-ethyl, flumezin, flumiclorac, flumioxazin, flumipropyn, see also uracil herbicides); dinitroaniline herbicides (e.g., benfluralin, butralin, chlornidine, dinitramine, dipropalin, ethalfluralin, fluchloralin, isopropalin, methalpropalin, nitralin, oryzalin, pendimethalin, prodiamine, profluralin, trifluralin); dinitrophenol herbicides (e.g., dinofenate, dinoprop, dinosam, dinoseb, dinoterb, DNOC, etinofen, medinoterb); diphenyl ether herbicides (e.g., ethoxyfen); nitrophenyl ether herbicides (e.g., acifluorfen, aclonifen, bifenox, chlomethoxyfen, chlornitrofen, etnipromid, fluorodifen, fluoroglycofen, fluoronitrofen, fomesafen, fucaomi, furyloxyfen, halosafen, lactofen, nitrofen, nitrofluorfen, oxyfluorfen); dithiocarbamate herbicides (e.g., dazomet, metam); halogenated aliphatic herbicides (e.g., alorac, chloropon, dalapon, flupropanate, hexachloroacetone, methyl bromide, methyl iodide, monochloroacetic acid, SMA, TCA); imidazolinone herbicides (e.g., imazamethabenz, imazamox, imazapic, imazapyr, imazaquin, imazethapyr); inorganic herbicides (e.g., ammonium sulfamate, borax, calcium chlorate, copper sulfate, ferrous sulfate, potassium azide, potassium cyanate, sodium azide, sodium chlorate, sulfuric acid); nitrile herbicides (e.g., bromobonil, bromoxynil, chloroxynil, dichlobenil, iodobonil, ioxynil, pyraclonil); organophosphorus herbicides (e.g., amiprofos-methyl, amiprophos, anilofos, bensulide, bilanafos, butamifos, 2,4-DEP, DMPA, EBEP, fosamine, glufosinate (e.g., glufosinate-P, glyphosate, huangcaoling piperophos); oxadiazolone herbicides (e.g., dimefuron, methazole, oxadiargyl, oxadiazon); oxazole herbicides (e.g., carboxazole, fenoxasulfone, isouron, isoxaben, isoxachlortole, isoxaflutole, methiozolin, monisouron, pyroxasulfone, topramezone); phenoxy herbicides (e.g., bromofenoxim, clomeprop, 2,4-DEB, 2,4-DEP, difenopenten, disul, erbon, etnipromid, fenteracol, trifopsime); phenoxyacetic herbicides (e.g., 4-CPA, 2,4-D, 3,4-DA, MCPA, MCPA-thioethyl, 2,4,5-T); phenoxybutyric herbicides (e.g., 4-CPB, 2,4-DB, 3,4-DB, MCPB, 2,4,5-TB); phenoxybutyric herbicides (e.g., 4-CPB, 2,4-DB, 3,4-DB, MCPB, 2,4,5-TB); phenoxypropionic herbicides (e.g., cloprop, 4-CPP, dichlorprop (e.g., dichlorprop-P), 3,4-DP, fenoprop, mecoprop (e.g., mecoprop-P); aryloxyphenoxypropionic herbicides (e.g., chlorazifop, clodinafop, clofop, cyhalofop, diclofop, fenoxaprop (e.g., fenoxaprop-P), fenthiaprop, fluazifop (e.g., fluazifop-P), haloxyfop (e.g., haloxyfop-P), isoxapyrifop, metamifop, propaquizafop, quizalofop (e.g., quizalofop-P), trifop); phenylenediamine herbicides (e.g., dinitramine, prodiamine); pyrazole herbicides (e.g., azimsulfuron, difenzoquat, halosulfuron, metazachlor, metazosulfuron, pyrazosulfuron, pyroxasulfone); pyrazole herbicides (e.g., benzofenap, pyrasulfotole, pyrazolynate, pyrazoxyfen, topramezone); phenylpyrazole herbicides (e.g., fluazolate, nipyraclofen, pinoxaden, pyraflufen); pyridazine herbicides (e.g., credazine, pyridafol, pyridate); pyridazinone herbicides (e.g., brompyrazon, chloridazon, dimidazon, flufenpyr, metflurazon, norflurazon, oxapyrazon, pydanon); pyridine herbicides (e.g., aminopyralid, cliodinate, clopyralid, diflufenican, dithiopyr, flufenican, fluroxypyr, haloxydine picloram, picolinafen, pyriclor, pyroxsulam, thiazopyr, triclopyr); pyrimidinediamine herbicides (e.g., iprymidam, tioclorim); pyrimidinyloxybenzylamine herbicides (e.g., pyribambenzisopropyl, pyribambenzpropyl); quaternary ammonium herbicides (e.g., cyperquat, diethamquat, difenzoquat, diquat, morfamquat, paraquat); thiocarbamate herbicides (e.g., butylate, cycloate, diallate, EPTC, esprocarb, ethiolate, isopolinate, methiobencarb, molinate, orbencarb, pebulate, prosulfocarb, pyributicarb, sulfallate, thiobencarb, tiocarbazil, tri-allate, vernolate); thiocarbonate herbicides (e.g., dimexano, EXD, proxan); thiourea herbicides (e.g., methiuron); triazine herbicides (e.g., dipropetryn, fucaojing, trihydroxytriazine); chlorotriazine herbicides (e.g., atrazine, chlorazine, cyanazine, cyprazine, eglinazine, ipazine, mesoprazine, procyazine, proglinazine, propazine, sebuthylazine, simazine, terbuthylazine, trietazine); fluoroalkyltriazine herbicides (e.g., indaziflam, triaziflam); methoxytriazine herbicides (e.g., atraton, methometon, prometon, secbumeton, simeton, terbumeton); methylthiotriazine herbicides (e.g., ametryn, aziprotryne, cyanatryn, desmetryn, dimethametryn, methoprotryne, prometryn, simetryn, terbutryn); triazinone herbicides (e.g., ametridione, amibuzin, ethiozin, hexazinone, isomethiozin, metamitron, metribuzin); triazole herbicides (e.g., amitrole, cafenstrole, epronaz, flupoxam); triazolone herbicides (e.g., amicarbazone, bencarbazone, carfentrazone, flucarbazone, ipfencarbazone, propoxycarbazone, sulfentrazone, thiencarbazone); triazolopyrimidine herbicides (e.g., cloransulam, diclosulam, florasulam, flumetsulam, metosulam, penoxsulam, pyroxsulam); uracil herbicides (e.g., benzfendizone, bromacil, butafenacil, flupropacil, isocil, lenacil, saflufenacil, terbacil); urea herbicides (e.g., benzthiazuron, cumyluron, cycluron, dichloralurea, diflufenzopyr, isonoruron, isouron, methabenzthiazuron, monisouron, noruron); phenylurea herbicides (e.g., anisuron, buturon, chlorbromuron, chloreturon, chlorotoluron, chloroxuron, daimuron, difenoxuron, dimefuron, diuron, fenuron, fluometuron, fluothiuron, isoproturon, linuron, methiuron, methyldymron, metobenzuron, metobromuron, metoxuron, monolinuron, monuron, neburon, parafluron, phenobenzuron, siduron, tetrafluron, thidiazuron); sulfonylurea herbicides (e.g., pyrimidinylsulfonylurea herbicides (e.g., amidosulfuron, azimsulfuron, bensulfuron, chlorimuron, cyclosulfamuron, ethoxysulfuron, flazasulfuron, flucetosulfuron, flupyrsulfuron, foramsulfuron, halosulfuron, imazosulfuron, mesosulfuron, metazosulfuron, methiopyrisulfuron, nicosulfuron, orthosulfamuron, oxasulfuron, primisulfuron, propyrisulfuron, pyrazosulfuron, rimsulfuron, sulfometuron, sulfosulfuron, trifloxysulfuron), triazinylsulfonylurea herbicides (e.g., chlorsulfuron, cinosulfuron, ethametsulfuron, iodosulfuron, metsulfuron, prosulfuron, thifensulfuron, triasulfuron, tribenuron, triflusulfuron, tritosulfuron)); thiadiazolylurea herbicides (e.g., buthiuron, ethidimuron, tebuthiuron, thiazafluron, thidiazuron); unclassified herbicides (e.g., acrolein, allyl alcohol, aminocyclopyrachlor, azafenidin, bentazone, bentranil, benzobicyclon, bicyclopyrone, buthidazole, calcium cyanamide, cambendichlor, chlorfenac, chlorfenprop, chlorflurazole, chlorflurenol, cinmethylin, clomazone, CPMF, cresol, cyanamide, ortho-dichlorobenzene, dimepiperate, dithioether, endothal, fluoromidine, fluridone, flurochloridone, flurtamone, fluthiacet, indanofan, methoxyphenone, methyl isothiocyanate, OCH, oxaziclomefone, pelargonic acid, pentachlorophenol, pentoxazone, phenylmercury acetate, prosulfalin, pyribenzoxim, pyriftalid, quinoclamine, rhodethanil, sulglycapin, thidiazimin, tridiphane, trimeturon, tripropindan, tritac).

Fertilizers include any micronutrient/fertilizer containing formulations that meet the definition of fertilizer as given by the AAPFCO (American Association of Plant Food Control Officials). Fertilizers include any material, whether of natural or synthetic origin, that is applied to soils or to plant tissues to supply one or more plant nutrients. Fertilizers include single nutrient ("straight") fertilizers (e.g., ammonium nitrate, superphosphates, etc.) as well as multinutrient (e.g., binary (NP, NK, PK) fertilizers and NPK fertilizers) fertilizers (e.g., monoammonium phosphate, diammonium phosphate, etc.). Nutrients include but are not limited to nitrogen, phosphorus, potassium, calcium, magnesium, sulfur, copper, iron, manganese, molybdenum, zinc, boron, silicon, cobalt, and vanadium.

The compositions described herein comprising amoebae, along with other optional components, find use in the treatment of potato soft rot and other associated disorders. In some embodiments, the compositions are applied to potatoes prior to or during storage. In some embodiments, compositions are applied to harvested potatoes prior to potatoes being placed in storage. As described herein, the strains of amoebae selected for use in the described compositions and methods demonstrated the ability to ingest bacteria at temperatures typically used for potato storage. In some embodiments, the storage is at approximately 10 degrees Celsius (e.g., 2-20, 2-15, 2-10, 4-10, 4-15, 5-10, 5-15, 8-12, 8-15, or 8-20 degrees Celsius).

In some embodiments, compositions are applied to a seed potato (e.g., the cut surface of a seed potato) prior to planting in order to prevent bacterial infection in the field.

In some embodiments, the amoebae compositions described herein find use in treating additional potato diseases caused by *Pectobacterium* and *Dickeya* (e.g., aerial stem rot and black leg). In some embodiments, the compositions further treat or prevent infection by an additional microorganism (e.g., *H. solani, Fusarium* sp., or *Streptomyces scabies*).

EXPERIMENTAL

The following examples are provided in order to demonstrate and further illustrate certain preferred embodiments and aspects of the present disclosure and are not to be construed as limiting the scope thereof.

Example 1—Identification of Strains that Feed on *Dickeya* or *Pectobacterium*

119 Dicty strains were screened for their ability to feed on *Dickeya* (Dd) or *Pectobacterium* (Pcc) at 10° C. This assay was performed by inoculating Dd or Pcc on a low nutrient medium (SM2 agar) that supports both bacterial and Dicty growth. Dicty spores from individual strains were then inoculated on top of the bacterial growth and incubated at 10° C. to mimic potato storage temperatures. Dicty strains that successfully fed on Dd or Pcc created visible clearings in the lawn of bacterial growth and ultimately produced sporangia (fruiting bodies) that rose from the agar surface. An example of the phenotype that was considered successful clearing of bacteria is shown in FIG. 3A. From this initial screen, 36 Dicty strains that were capable of feeding on both Dd and Pcc at 10° C. were identified (FIG. 1B).

Of the 36 strains capable of feeding on both Dd and Pcc, 34 came from the Group 4 Dictyostelids (FIG. 1). This group includes *D. discoideum, D. giganteum, D. minutum, D. mucoroides, D. purpureum, and D. sphaerocephalum* (72). The results indicate that this group is particularly enriched in Dd and Pcc-feeding strains.

Figure 2:
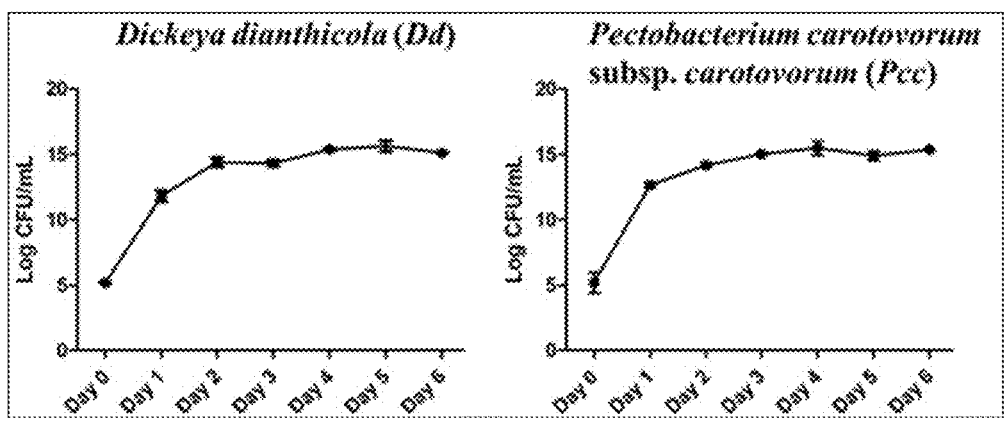
FIG. 2 shows growth curves of Dd and Pcc on MPMs over SM2 nutrient agar.

A further experiment was performed to identify Dicty species capable of feeding on biofilms of Dd and Pcc. Microporous polycarbonate membranes (MPMs) are widely reported to support biofilm formation of numerous Enterobacteriaceae species (2, 63, 70, 71). It was determined if Dd and Pcc formed biofilms on MPMs and determined if Dicty strains were capable of feeding on these biofilms. Membranes were placed on top of SM2 agar to provide Dd and Pcc with nutrients for growth. Bacteria were then inoculated on the surface of the MPMs and growth was monitored over the course of 1 week by washing bacteria off the membranes and performing dilution plating for colony counting. Growth of both bacterial strains plateaued around 4 dpi (FIG. 2).

From these results, it was determined that the best time to collect inoculated MPMs for biofilm analysis was at 2 dpi. Scanning electron microscopy (SEM) is commonly used to confirm biofilm formation by detecting extracellular polymeric substance (EPS) that forms the biofilm matrix (2). Samples of Dd and Pcc after 2 days of growth on MPMs in the presence and absence of Dicty are analyzed using SEM.

19 Dicty strains identified as active were tested for their ability to feed on Dd and Pcc growing on MPMs. These experiments were performed by establishing Dd and Pcc growth on MPMs overlaid on SM2 agar at 37° C. for 24 hr. Dicty spores were then applied to the center of bacterial growth in a 5 uL drop containing 1000 spores. Bacteria and Dicty were incubated at 10° C. for 2 weeks before remaining bacteria were washed off and colonies were counted. Representative images of Dicty growing on Dd and Pcc on MPMs are shown in FIG. 3A.

No Dicty strains produced a statistically significant reduction in Dd viability compared to the non-treated control. However, treating Dd lawns with Cohen 36, Cohen 9, WS-15, WS-20, and WS-69 consistently reduced the number of viable bacteria by approximately 100,000-fold compared to the non-treated control (FIG. 3B). Cohen 9 was the only Dicty strain that produced a statistically significant reduction in viability of Pcc compared to the non-treated control (FIG. 3C). Other Dicty strains capable of reducing the number of viable Pcc by at least 100,000-fold were Cohen 35, Cohen 36, WS-647, and WS-69 (FIG. 3C).

Figure 3:
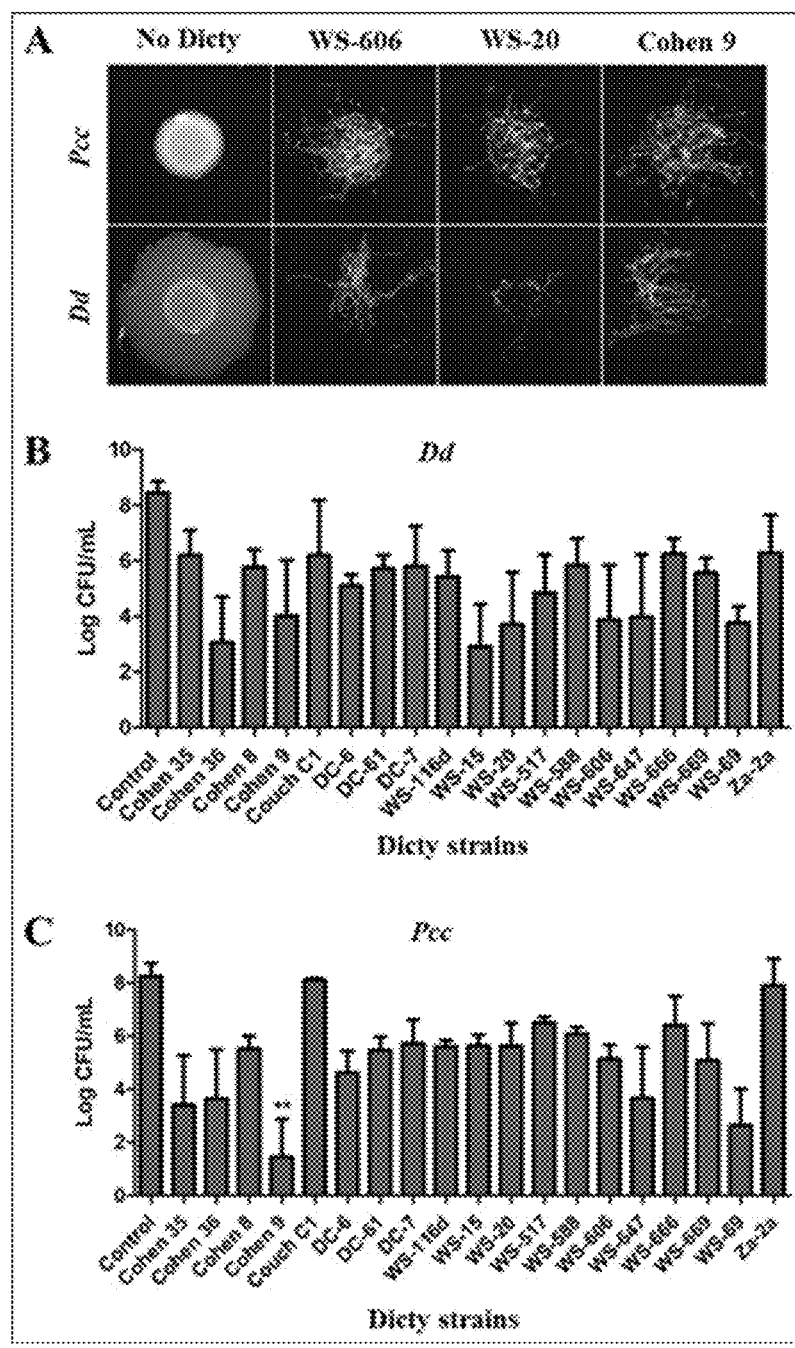
FIG. 3 shows (A) Lawns of Dd and Pcc growth were established on MPMs before Dicty spores were added. Clearing of the bacterial colony and sporulation of Dicty at 10° C. was observed. (B) Viable Dd and (C) Pcc remaining after 2 weeks of coculture with Dicty.

It was observed that Dicty strains Cohen 9, Cohen 36, and WS-69 were capable of feeding on both Dd and Pcc when these bacteria were cultured on SM2 agar and MPMs (FIGS. 1 and 3). These strains were also particularly effective feeders as all three reduced the number of viable Dd and Pcc on MPMs at 10° C. by 100,000-fold compared to the non-treated control (FIGS. 3B and 3C).

To determine if these strains could suppress soft rot development on seed potato tubers, tubers were tab-inoculated with Dd or Pcc and treated with spores from each Dicty strain. Seed potatoes were surface-sterilized and punctured using a sterile screw to a depth of 1.5 mm. Overnight cultures of Dd and Pcc were suspended in 10 mM potassium phosphate buffer, diluted to an OD600 of approximately 0.003, and administered as a 5 μL drop into the wound. Next, 5 of a Dicty spore suspension (100,000 spores) was added to the wound. Inoculated seed potatoes were placed in a plastic container with moist paper towels and were misted with water twice a day to maintain a high humidity. After 3 days at room temperature, seed potatoes were sliced in half and the area of macerated tissue was quantified using ImageJ.

Figure 4:
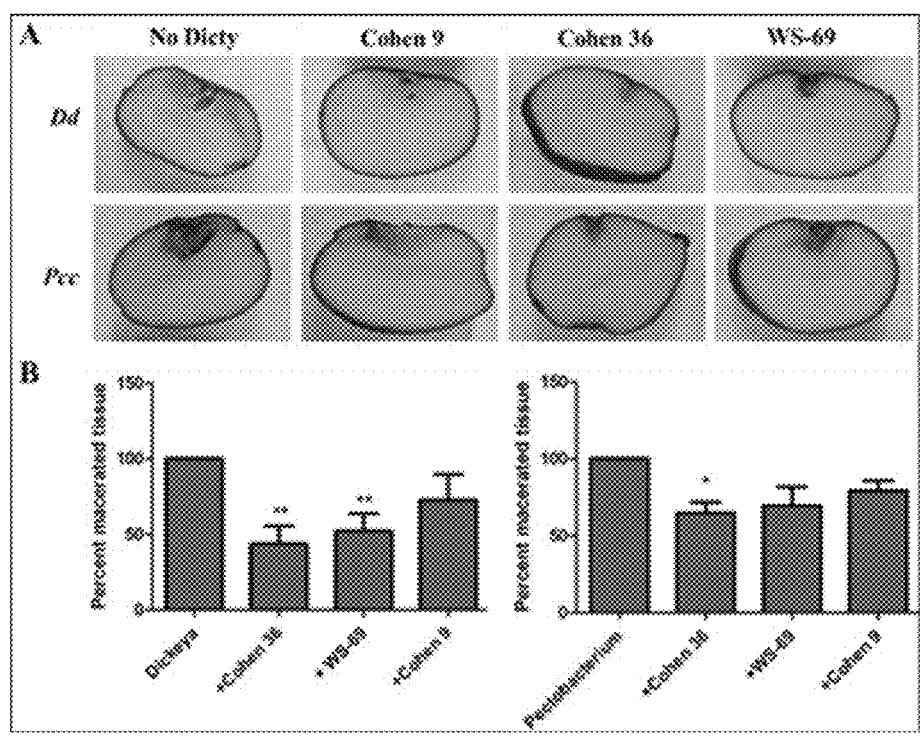
FIG. 4 shows soft rot development on seed potato tubers stab-inoculated with Dd or Pcc and treated with Dicty spores. (A) Representative images of soft rot development inside of seed potatoes. (B) Macerated tissue area of seed potato tubers inoculated with Dd (left) or Pcc (right) was quantified using ImageJ.

All three strains reduced the severity of soft rot caused by Dd and Pcc (FIG. 4). Cohen 36 was the most effective strain on both Dd and Pcc: reducing the area of tissue maceration by 60% and 35%, respectively (FIG. 4B). Treating seed potatoes with WS-69 reduced the area of tissue maceration by 50% and 30% for Dd and Pcc, respectively (FIG. 4B). Finally, Cohen 9 was the least effective, but still able to reduce tissue maceration caused by Dd and Pcc by 25% and 20%, respectively (FIG. 4B).

Figure 7:
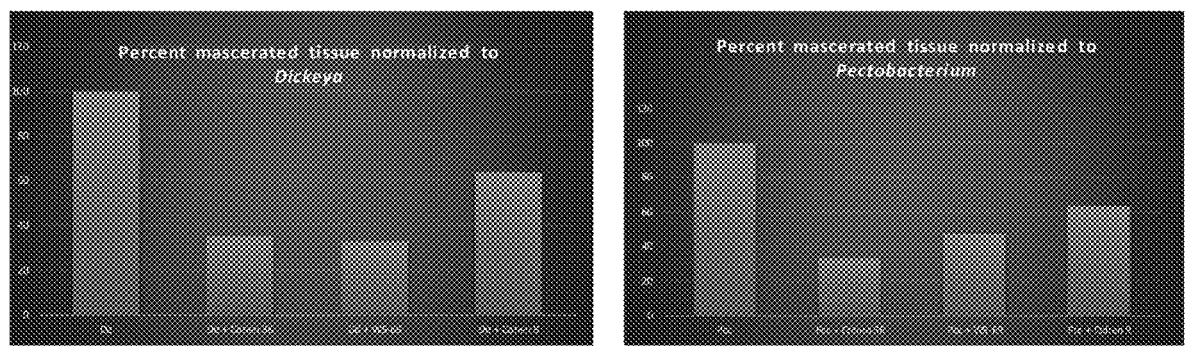
FIG. 7 shows that three Dicty isolates control Dd and Pcc in seed tubers (at 25° C.).

FIG. 7 shows that three Dicty isolates control Dd and Pcc in seed tubers (at 25° C.). Two sets of data from different weeks were normalized to the *Dickeya* or *Pectobacterium* only bacterial control. The average area of macerated potato tissue measured in $mm^2$ was set as "1" or "100%". The average of all the other treatments including Dicty were divided by bacteria only control and multiplied by 100 to obtain a percentage. Each set contained 5 tubers per treatment.

Figure 5:
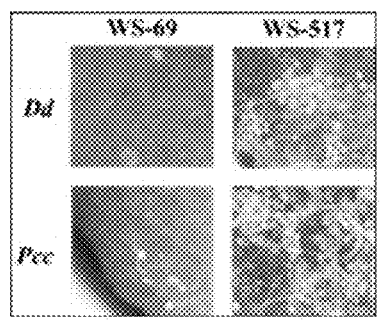
FIG. 5 shows representative images of Dicty strains WS-69 and WS-517 sporulating at 10° C. on a potato surface in the presence of Dd or Pcc.

Dicty should be capable of sporulating at temperatures as cold as 10° C. on a potato surface if they are applied as a one-time pre-planting or post-harvest treatment. Sporulation was assessed by inoculating small potato discs (5×6 mm) with 10 μL of Dd or Pcc suspensions at an OD600 of $3 \times 10^{-5}$ and Dicty spores at a concentration of $1 \times 10^7$ spores/mL. Potato discs were kept in a covered 96-well plate for two weeks at 10° C. followed by visual inspection for son using a dissecting microscope. Representative images of a strain producing many sori (WS-517) and a strain producing few sori (WS-69) are shown in FIG. 5. Of the 11 strains evaluated, only Cohen 9 and WS-20 were unable to sporulate in the presence of both pathogens (Table 1).

TABLE 1

Assessment of Dicty sporulation at 10° C. on potato in the presence of Dd or Pcc. A (✓) indicates sori have been observed while a (✗) means they have not.

| Dicty strain | Dd | Pcc |
| --- | --- | --- |
| Cohen 9 | ✓ | ✗ |
| Cohen 36 | ✓ | ✓ |
| WS-69 | ✓ | ✓ |
| WS-517 | ✓ | ✓ |
| WS-588 | ✓ | ✓ |
| WS-606 | ✓ | ✓ |
| WS-15 | ✓ | ✓ |
| WS-20 | ✗ | ✓ |
| DC-7 | ✓ | ✓ |
| DC-61 | ✓ | ✓ |
| WS-116d | ✓ | ✓ |

Example 2—High Throughput Screen

This example describes the use of a high throughput screening assay to identify Dicty strains from Alaska (e.g., BAC10A, BAF6A, BAC3A, NW2, KB4A (ATCC® MYA-4262™) SO8B, SO3A, BAF9B, IC2A (ATCC® MYA-4259™), AK1A1 (ATCC® MYA-4272™) PBF4B (ATCC® MYA-4263), PBF8B, BSB1A, SO5B (ATCC® MYA-4249), PBF3C, PBF6B, NW2B, NW10B (ATCC® MYA-4271™), PBF9A, IC5A (ATCC® MYA-4256TH), ABC8A (ATCC® MYA-4260), NW16B, ABC10B, ABB6B (ATCC® MYA-4261), BA4A (ATCC® MYA-4252), AKK5A, AKK52C, HP4 (ATCC® MYA-4286), HP8 (ATCC® MYA-4284), or NW9A) that feed on Dd and Pcc at 10° C. on potatoes.

Figure 6:
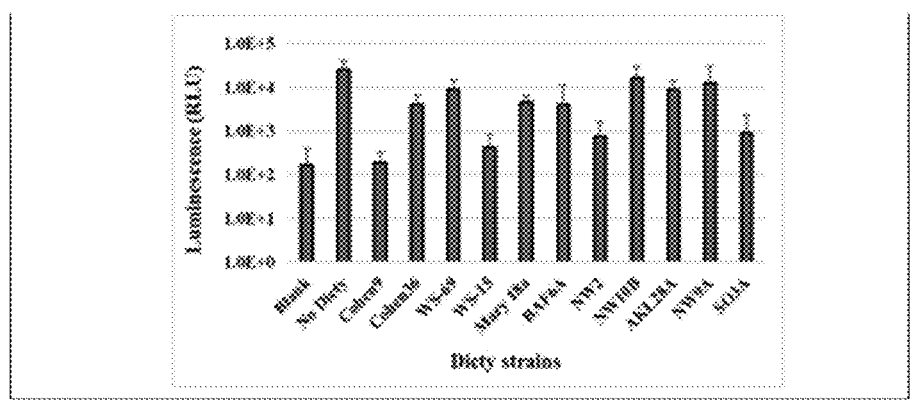
FIG. 6 shows viability of Dd incubated at 10° C. was assessed at 88 hours post inoculation.

Results from 11 Dicty strains screened against Dd at 10° C. are presented in FIG. 6. Data was analyzed for significance using a one-way analysis of variance (ANOVA; alpha =0.05) with Tukey's honest significant difference (HSD) test to compare means between the treatments and the No Dicty control. A reduction in Dd proliferation when potato discs were treated with Dicty strains Cohen 9, Cohen 36, WS-15, Maryland 18a, BAF6A, NW2, and SO3A.

The Alaskan Dicty strains, and those identified in Example 1, are further tested against coinfections of Dd and Pcc. It is useful to identify Dicty strains that can suppress Dd and Pcc coinfections as these two pathogens have been isolated together from diseased potatoes (15). The ability of Dicty strains with different feeding preferences (Dd vs. Pcc) to complement each other when administered as a cotreatment is assayed.

Example 3—Production of Spores

This example describes methods for producing spores of Dicty. While Dicty can feed as single-celled amoeba in liquid culture, they are unable to form sporangia and produce spores unless a solid support is present (39). This means that liquid fermentation methods are unsuitable for mass production of Dicty spores. Instead, solid-state fermentation is utilized in which Dicty grow in the presence of *E. coli* on a solid support. This method of fermentation has been utilized for centuries in Asian regions for the production of fermented foods such as soy sauce, tempe, koji, and Japanese rice wine (77). Simply defined, solid-state fermentation is the cultivation of microorganisms on the surface of absorbent solid materials that provide enough moisture to maintain microbial growth but limit free-moving water (77, 78).

In an exemplary production method for production of Dicty spores, vermiculite is used as a solid support. Vermiculite is a hydrous phyllosilicate mineral that undergoes significant expansion when heated in a process called exfoliation. Exfoliated vermiculite is highly absorbent, inert, inorganic, and boasts a large surface area capable of supporting Dicty sporulation in 3-D. Large commercial vermiculite mines provide a cheap and readily available supply of this mineral. The large, 3-D surface area of vermiculite allows for more spore production per volume than agar. The highly absorbent and inorganic nature of vermiculite means it can retain moisture necessary for Dicty growth while reducing the threat of contamination from other microbes that nutrient agar is particularly susceptible to.

Cultivation of Dicty spores on vermiculite is performed as follows. Coarse vermiculite (grade 4) is sterilized in a wire mesh cage by autoclaving. Sterile vermiculite is then saturated with an inorganic solution (10 mM potassium phosphate) containing high density *E. coli* seeded with Dicty spores. The use of an inorganic buffer further reduces the possibility of contamination as the only carbon sources present for microbial growth are *E. coli* and Dicty cells. Saturated vermiculite is then placed in a high humidity chamber (>90% RH) under constant light to induce sporulation (39). Experiments have been performed in square petri dishes using Dicty strain WS-269b. The images in FIG. 8 demonstrate extensive sporulation by WS-269b on vermiculite. Yields of $3.11\times10^{8}$ spores from a single plate (~50 mL of vermiculite) were achieved using this method, which is almost twice the yield of WS-269b cultivated on nutrient agar ($1.73 \times 10^8$ spores).

Figure 8:
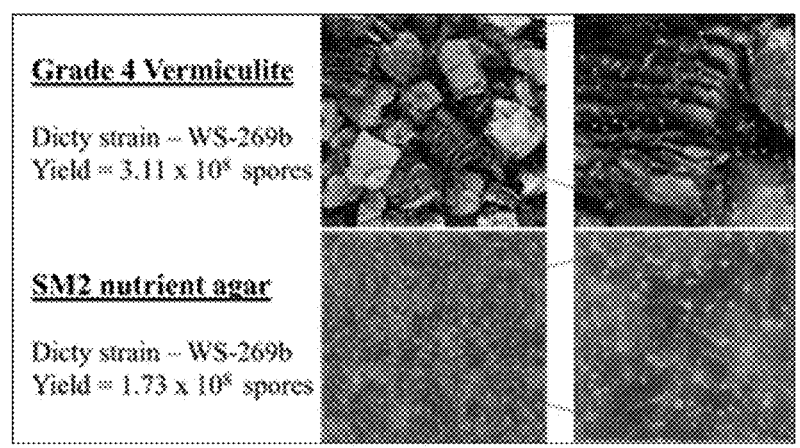
FIG. 8 shows Dicty strain WS-269b sporulating on SM2 agar (lower) or vermiculite in the presence of *E. coli*.

Greater yields are achieved through further optimization of the fermentation method. Since *E. coli* are suspended in buffer lacking nutrients, the initial cell density available for Dicty to feed on does not increase due to bacterial growth. Therefore, the optimal *E. coli* density required by Dicty for maximum spore production is determined. The data in FIG. 8 were generated by inoculating vermiculite with *E. coli* at an OD600 of 2 and WS-269b spores at $2 \times 10^4$ spores/mL. The optimal *E. coli* concentration is determined by saturating vermiculite with *E. coli* suspensions at an OD600 of 2, 4, 6, 8, and 10 keeping the Dicty spore concentration constant at $2 \times 10^4$ spores/mL. Dicty are cultivated for two weeks under constant light at 90% relative humidity before spores are harvested and counted using a hemacytometer. Once the optimal density of *E. coli* is known, the optimal seeding density of Dicty spores is determined by testing concentrations of $2 \times 10^2$, $2 \times 10^3$, $2 \times 10^4$, and $2 \times 10^5$ spores/mL.

The experiments described above are performed in a small bioreactor that can maintain constant light, temperature, and humidity. In some embodiments, for large-scale production of Dicty spores, a 3-D matrix conducive to the cultivation of Dicty spores (BioPharm Laboratories, LLC (Bluffdale, Utah)) is utilized. This application retains bacteria and bacterial aggregates while removing the bacterial media that inhibits Dicty growth. Spores are easily harvested by dissolving the matrix in a mild buffer. In some embodiments, Dicty spores are cultivated on heat-killed *E. coli*. This allows for cultivation of spores free of living bacteria.

Example 4—Formulation

This example describes methods for lyophilization, rehydration, and formulation of compositions comprising Dicty Spores.

Lyophilization has been shown to be a robust method for long-term storage of viable Dicty spores (39, 41). It is a widely used method for preserving microbial pesticides that makes long-term storage, distribution, and application feasible for treatments that are often less stable than their chemical counterparts (80, 81). Lyophilization preserves living microorganisms by freezing and dehydrating them through sublimation of ice in a vacuum. While lyophilization has been proven effective for long-term storage of many bacteria, yeast, and sporulating fungi, it is a harsh process that can significantly reduce sample viability if stabilizers are not employed (82). Non-fat skim milk (NFSM) has long been used as an effective stabilizer during lyophilization of yeast and fungal spores especially when used in combination with other sugars (80, 83, 84). In addition to stabilizers, the rate of freezing can have a large impact on sample viability (80).

Detailed viability studies on Dictyostelids subjected to lyophilization in the presence of stabilizers are lacking. The ideal lyophilization conditions for Dicty spores described herein are determined. Spores from these strains are suspended in 0, 5, and 10% NFSM buffer (10 mM potassium phosphate) at concentrations of $1 \times 10^8$, $1 \times 10^9$, and $1 \times 10^{10}$ spores/mL (80, 84). Spore viability is determined by plating 100 spores suspended in 200 uL of *E. coli* on an SM2 agar plate. After 5 days, plaques in the bacterial lawn caused by Dicty feeding are counted, and the percentage of viable spores determined. Viability is assessed before freezing the spores at $-20°$ C., after freezing, and after lyophilization.

In some applications, additional stabilizers are used. Previous studies on yeast and bacterial biocontrols have shown that polysaccharides trehalose, lactose, and sucrose can substantially increase viability of lyophilized microorganisms when used in conjunction with NFSM (80, 83, 84). Using the optimal spore and NSFM concentration identified in the previous experiment, trehalose, lactose, and sucrose are included at concentrations of 5 and 10%. Viability is assessed before freezing the spores at $-20°$ C., after freezing, and after lyophilization.

Different rates of freezing are investigated. The ideal cooling rate allows cells to retain water while keeping that water in an amorphous state until the freezing point is reached, thus avoiding the formation of intracellular ice crystals that will rupture membranes (83, 85). These studies reported optimal cooling rates around 3-7° C./min for yeast. Dicty spores are subjected to both direct and progressive cooling regimens. Using the optimal spore and stabilizers identified in the previous experiments, Dicty spores are frozen directly ($-12°$ C. and $-20°$ C.) and progressively (4° C. for 2 hr, $-12°$ C. for 8 hr, and $-20°$ C. overnight) (80). Viability is assessed before freezing the spores at $-20°$ C., after freezing, and after lyophilization.

Studies conducted on *D. discoideum* have shown that germination can be induced in dormant spores through heat-shock, 1% peptone, or a combination of the two (41, 86). Rehydration of Burkholderia vietnamiensis in 10% NFSM was also shown to promote viability upon rehydration (84). Lyophilized spores are reconstituted in peptone at concentrations of 1, 2, and 4% in the presence or absence of NFSM at a concentration of 10%. Spores are then incubated at temperatures of 25, 35, or 45° C. for 30 min. Percent germination is assessed using the viability assay described previously.

Shelf life of lyophilized Dicty spores is determined by reviving lyophilized Dicty spores using the optimal process described above. Spore germination is then be assessed on a monthly basis for two years.

The application rate of a Dicty treatment for potato soft rot is determined using an in vitro assay and treating Dd and Pcc with a range of Dicty spore concentrations. In current experiments, potato discs are treated with 10 μL of Dicty spores at a concentration of $1 \times 10^7$ spores/mL (100,000 spores per disc). The efficacy of a reduced application is determined by testing the efficacy of multiple spore concentrations: $1 \times 10^5$, $5 \times 10^5$, $1 \times 10^6$, $5 \times 10^6$, and $1 \times 10^7$ spores/mL. The two application rates demonstrating the best bacterial growth suppression are used in storage trials.

Example 5—Potato Treatment and Storage

This example describes field trials of potatoes treated with formulations of Dicty spores.

Potato treatment and storage trials are conducted to determine if Dicty can effectively reduce soft rot under commercial conditions and determine if Dicty can mitigate other common potato diseases and is compatible with standard commercial treatments for these diseases. Experiments are performed to determine the effectiveness of Dicty under commercial potato storage conditions. The trials are conducted at the University of Wisconsin Hancock Agriculture Research Station—Storage Research Facility (SRF) in Hancock, Wis. This facility supports small to large-scale disease storage trials under controlled conditions comparable to those that meet commercial standards.

It is first determined if Dicty are compatible with fungicides commonly applied to potatoes. Dicty applied to potatoes in storage may need to withstand treatments applied to potatoes for other pathogens. Antifungals are commonly applied to seed potatoes before planting and after harvest when potatoes go into storage. Two important fungal diseases of potato are silver scurf (*Helminthosporium solani*) and dry rot (*Fusarium* species), which can cause significant loss of potato mass and value in storage (87-89). To limit fungal diseases such as these at the time of planting, seed potatoes are often treated with fungicides containing active ingredients such as thiabendazole, flutolanil, azoxystrobin, mancozeb, and fludioxonil (89). A second, yet somewhat overlapping, suite of fungicides are often used on potatoes going in to storage; this suite includes mono- and di-basic salts of phosphorous acid, and a pre-mix fungicide containing azoxystrobin, difenoconazole, and fludioxonil. The effect of a subset of these fungicides on Dicty spore germination and viability is determined using a plaque assay. Each fungicide is applied at the recommended label rate and commonly used co-treatments of fungicides are tested. Experiments are conducted at the SRF on cut seed potatoes before planting and whole potatoes for over-winter storage.

In a first seed treatment trial, cut seed potatoes are treated with the three most promising Dicty strains identified from the above experiments. Many commercial potato growers cut their seed potatoes before planting to increase the acreage planted from this vegetatively propagated crop. The cut surface is typically healed to prevent opportunistic pathogen infections after cutting and fungicide application. Potatoes form a natural layer of protective tissue at the cut site through a process called suberization (95). Growers employ this process by storing cut seed potatoes for 2-7 days at conditions that are conducive to suberization: high humidity (>95% RH) and temperatures around 10-12° C.

Seed potatoes are at their highest risk for infection shortly after cutting and before suberization has completed. Cut seed potatoes are treated with Dicty spores to determine if they can provide protection against soft rot during this critical time. Seed potatoes are inoculated with a suspension of Dd or Pcc. This is followed by treatments with three Dicty strains using three application rates: $1\times10^6$, $1\times10^7$, and $1\times10^8$ spores/mL. These rates include a current application rate for in vitro experiments ($1\times10^7$ spores/mL) plus rates that are ten-fold lower and ten-fold higher. Controls include non-inoculated potatoes, Dd and Pcc without Dicty, and Dicty treatments at $1\times10^8$ spores/mL without bacteria to ensure that Dicty are non-toxic to potatoes. Approximately 320 cut seed pieces are used for each treatment condition. Potatoes are allowed to dry before being stored for one week at 12° C. and 98% relative humidity (RH).

After 24 hr, and then one-week post-treatment, seed potatoes are visually inspected for symptoms of soft rot. Seed potatoes are then planted in field research plots using a randomized complete block design with 4 replications. The percent of potato plants that emerge are recorded for each treatment and symptoms of blackleg are monitored throughout the growing season. After harvest, potatoes are counted, weighed, and inspected for signs of soft rot that had developed in the field. This experiment determines the ability of Dicty to prevent disease before planting, during growth, and post-harvest.

The seed potato trial described above utilizes freshly-harvested Dicty spores that have not undergone lyophilization and seed potatoes are not be treated with fungicides that are normally applied at planting. Seed potato trials are conducted using the optimal lyophilization method and compatible fungicides identified in the above experiments.

An additional storage trial is conducted at the large scale. This trial utilizes a prototype product at a single application rate, a non-treated control, and potatoes treated with a commercial grower standard, such as hydrogen peroxide. Dicty spores are administered to potatoes using a commercial sprayer as they are piled into a 200,000 lb capacity storage bin that is approximately 12 ft2 by 24 ft tall; the height of a commercial storage pile of potatoes is typically 18 ft. The experimentation under this commercially heighted bin influences air flow, and temperature and moisture management, which play an important role in disease management. Bacterial inoculum are administered by placing 30 lb of wounded potatoes in a plastic mesh bag and dipping them in a solution containing Dd and Pcc. These bags represent "hot spots" of soft rot development that can occur in any place in or on a large potato pile. The Dicty treatment is also applied to potatoes in the inoculated bags before they are buried in the pile. Four bags are inoculated and placed in separate quadrants, and at 3 unique depths including at the surface of the pile. After one week of storage, the inoculated bags at the top of the pile are examined and replaced to assess disease progress in the control treatments. Formal evaluations of the treatments are then made at the first and second months of storage. Final destructive sampling takes place at the end of month three. Tubers within the bags and tubers surrounding bags are evaluated for disease (as previously described).

Example 6—Other Target Pathogens

This example describes assay to determine the ability of Dicty strains described herein to treat other potato diseases. It is determined if Dicty identified above for treatment of soft rot can feed on *Fusarium* species, *H. solani*, and the causative agent of potato common scab (*Streptomyces scabies*). Over a century ago, George Potts was the first to cultivate a Dictyostelid species (*D. mucoroides*) on sterile media in the presence of bacteria (90). Thirty-seven years later, Raper and Smith demonstrated that *D. discoideum* was capable of feeding on 21 diverse human and plant bacterial pathogens (1). Only within the last two decades have studies identified Dictyostelids capable of ingesting single-celled yeast such as *Cryptococcus neoformans, Saccharomyces cerevisiae* and *Candida* species (91, 92). A study from 2015 demonstrated that *D. discoideum* is even capable of ingesting conidia from the filamentous fungus *Aspergillus nidulans* (93). Dicty capable of feeding on other major storage pathogens of potatoes are identified. This includes fungal pathogens *H. solani* and *Fusarium* species as well as the bacterial pathogen *Streptomyces scabies* (common scab).

The ability of Dicty to suppress fungal growth is assayed by coculturing *H. solani* or *Fusarium* spores with Dicty spores on minimal media. These fungi are readily cultured on low-nutrient media, which is important since Dicty do not feed on nutrient-rich media such as LB or potato dextrose agar (PDA). If fungal sporulation is successful, radial growth of emergent hyphae is recorded daily to determine if Dicty can reduce fungal growth on agar. To confirm that the Dicty strains are compatible with fungal growth media, Dicty is grown in the presence of *E. coli* on this media to determine if Dicty can feed and sporulate. Experiments are performed at 10° C. and 25° C. Image analysis of growth area is performed using ImageJ.

In contrast to these fungal pathogens, potato common scab is caused by the gram-positive bacterium *S. scabies*. Like silver scurf, this disease causes blemishes on the tuber surface that greatly reduce potato value and promote secondary infections and shrinkage (94). Dicty are capable of feeding on another gram-positive plant pathogen, *C. michiganensis*. A growth medium that supports both *S. scabies* and Dicty is identified by testing SM2, oatmeal, and yeast malt extract agar. If none of these media support growth of both *S. scabies* and Dicty, *S. scabies* is cultured on an MPM on top of oatmeal agar and incubated at 28° C. to first establish bacterial growth. The membrane is then transferred to water agar and inoculated with Dicty spores. Bacterial viability is assessed over time.

REFERENCES

1. Raper K B & Smith N R (1939) The Growth of *Dictyostelium discoideum* upon Pathogenic Bacteria. *Journal of bacteriology* 38(4):431-445.

2. Sanders D, et al. (2017) Multiple Dictyostelid Species Destroy Biofilms of *Klebsiella oxytoca* and Other Gram Negative Species. *Protist* 168(3):311-325.

3. Charkowski A O (2015) Biology and control of *Pectobacterium* in potato. 92(2):223-229.

4. ELPHINSTONE J G & PÉROMBELON M C M (1987) Control of contamination of potatoes with air-borne *Erwinia carotovora* by foliar application of copper oxychloride. 110(3):535-544.

5. Pérombelon M C M, Fox R A, & Lowe R (1979) Dispersion of *Erwinia carotovora* in Aerosols Produced by the Pulverization of Potato Haulm Prior to Harvest. 94(3):249-260.

6. Pérombelon M C M (2002) Potato diseases caused by soft rot erwinias: an overview of pathogenesis. 51(1):1-12.

7. Ross H (Potato Breeding Problems and Perspectives) 1986. *Advances in Plant Breeding*, (Paul Parey Scientific Publishers, Berlin, Germany), pp 5-68.

8. Czajkowski R, Pérombelon M C M, van Veen J A, & van der Wolf J M (2011) Control of blackleg and tuber soft rot of potato caused by *Pectobacterium* and *Dickeya* species: a review. 60(6):999-1013.

9. NASS (2018) Potatoes 2017 Summary. (United States Department of Agriculture-National Agricultural Statistics Service).

10. Bhat K A, et al. (2010) Current Status of Post Harvest Soft Rot in Vegetables: A Review. *Asian Journal of Plant Sciences* 9:200-208.

11. Rosenzweig N, Steere L, Hammerschmidt R, & Kirk W (2016) Tuber soft rot, blackleg and aerial stem rot. in *Michigan Potato Diseases* (Michigan State University).

12. Birch P R J, et al. (2012) Crops that feed the world 8: Potato: are the trends of increased global production sustainable? *Food Security* 4(4):477-508.

13. Brandwein M, et al. (2016) Mitigation of Biofilm Formation on Corrugated Cardboard Fresh Produce Packaging Surfaces Using a Novel Thiazolidinedione Derivative Integrated in Acrylic Emulsion Polymers. *Frontiers in microbiology* 7:159-159.

14. Johnson S B (2015) Blackleg and Bacterial Soft Rot. ed Extension UoMC.

15. Charkowski A O (2018) The Changing Face of Bacterial Soft-Rot Diseases. *Annu Rev Phytopathol* 56:269-288.

16. Düring K, Porsch P, Fladung M, & Lörz H (1993) Transgenic potato plants resistant to the phytopathogenic bacterium *Erwinia carotovora*. 3(4):587-598.

17. Marquez-Villavicencio MdP, Groves R L, & Charkowski A O (2011) Soft Rot Disease Severity Is Affected by Potato Physiology and *Pectobacterium taxa*. Plant Disease 95(3):232-241.

18. Toth I K, et al. (2011) *Dickeya* species: an emerging problem for potato production in Europe. 60(3):385-399.

19. Jiang H H, Hao J J, Johnson S B, Brueggeman R S, & Secor G (2016) First Report of *Dickeya dianthicola* Causing Blackleg and Bacterial Soft Rot on Potato in Maine. *Plant Disease* 100(11):2320-2320.

20. Harding M W, Olson M E, Marques L L R, & Howard R J (2011) Biology and management of microbial biofilms on plant surfaces *Acta Horticulturae* (905):43-55.

21. Hossain M M & Tsuyumu S (2006) Flagella-mediated motility is required for biofilm formation by *Erwinia carotovorum* subsp. carotovorum. *Journal of General Plant Pathology* 72(1):34-39.

22. Reverchon S & Nasser W (2013) *Dickeya* ecology, environment sensing and regulation of virulence programme. Environmental microbiology reports 5(5):622-636.

23. Costerton J W, Stewart P S, & Greenberg E P (1999) Bacterial biofilms: a common cause of persistent infections. *Science* (New York, N.Y.) 284(5418):1318-1322.

24. Barak J D, Jahn C E, Gibson D L, & Charkowski A O (2007) The role of cellulose and O-antigen capsule in the colonization of plants by *Salmonella enterica. Mol Plant Microbe Interact* 20(9):1083-1091.

25. Yap M N, Yang C H, Barak J D, Jahn C E, & Charkowski A O (2005) The *Erwinia chrysanthemi* type III secretion system is required for multicellular behavior. *J Bacteriol* 187(2):639-648.

26. Yap M N, Rojas C M, Yang C H, & Charkowski A O (2006) Harpin mediates cell aggregation in *Erwinia chrysanthemi* 3937. *J Bacteriol* 188(6):2280-2284.

27. Jahn C E, Selimi D A, Barak J D, & Charkowski A O (2011) The *Dickeya dadantii* biofilm matrix consists of cellulose nanofibres, and is an emergent property dependent upon the type III secretion system and the cellulose synthesis operon. *Microbiology* 157(Pt 10):2733-2744.

28. Jahn C E, Willis D K, & Charkowski A O (2008) The flagellar sigma factor fliA is required for *Dickeya dadantii* virulence. *Mol Plant Microbe Interact* 21(11):1431-1442.

29. Yang S, et al. (2008) Dynamic regulation of GacA in type III secretion, pectinase gene expression, pellicle formation, and pathogenicity of *Dickeya dadantii* (*Erwinia chrysanthemi* 3937). *Mol Plant Microbe Interact* 21(1):133-142.

30. Charkowski A, et al. (2012) The role of secretion systems and small molecules in soft-rot Enterobacteriaceae pathogenicity. *Annu Rev Phytopathol* 50:425-449.

31. Walters M C, 3rd, Roe F, Bugnicourt A, Franklin M J, & Stewart P S (2003) Contributions of antibiotic penetration, oxygen limitation, and low metabolic activity to tolerance of *Pseudomonas aeruginosa* biofilms to ciprofloxacin and tobramycin. *Antimicrob Agents Chemother* 47(1):317-323.

32. Fux C A, Costerton J W, Stewart P S, & Stoodley P (2005) Survival strategies of infectious biofilms. *Trends in microbiology* 13(1):34-40.

33. Stewart P S (2002) Mechanisms of antibiotic resistance in bacterial biofilms. *International journal of medical microbiology: IJMM* 292(2):107-113.

34. Stewart P S & Costerton J W (2001) Antibiotic resistance of bacteria in biofilms. *Lancet* (London, England) 358(9276):135-138.

35. Harrison J J, et al. (2005) Persister cells mediate tolerance to metal oxyanions in *Escherichia coli. Microbiology* 151(Pt 10):3181-3195.

36. Howard R J, et al. (2015) Efficacy of agricultural disinfectants on biofilms of the bacterial ring rot pathogen,

*Clavibacter michiganensis* subsp. sepedonicus. *Canadian Journal of Plant Pathology* 37(3):273-284.

37. Teitzel G M & Parsek M R (2003) Heavy metal resistance of biofilm and planktonic *Pseudomonas aeruginosa*. *Appl Environ Microbiol* 69(4):2313-2320.

38. Czajkowski R, de Boer W J, & van der Wolf J M (2013) Chemical disinfectants can reduce potato blackleg caused by '*Dickeya solani*'. *European journal of plant pathology* 2013 v.136 no. 2(no. 2): pp. 419-432.

39. Raper K B & Rahn A W (1984) *The Dictyostelids* (Princeton University Press).

40. Cavender J C & Raper K B (1965) THE ACRASIEAE IN NATURE. I. ISOLATION. *American journal of botany* 52:294-296.

41. Cotter D A & Raper K B (1968) Properties of germinating spores of *Dictyostelium discoideum*. *J Bacteriol* 96(5):1680-1689.

42. Horn E G (1971) Food Competition Among the Cellular Slime Molds (Acrasieae).
Ecology 52(3):475-484.

43. Swanson A R, Spiegel F W, & Cavender J C (2002) Taxonomy, slime molds, and the questions we ask. *Mycologia* 94(6):968-979.

44. Swanson A R, Vadell E M, & Cavender J C (2001) Global distribution of forest soil dictyostelids. 26(1):133-148.

45. Swanson A R (2004) A guide to the common dictyostelid slime molds of Great Smokey Mountains National Park. (The Eumycetozoan Project), p 13.

46. Cavender J C (2013) *A Global Overview of Dictyostelid Ecology with Special Emphasis in North American Forest* (Springer, Berlin, Heidelberg).

47. Schaap P, et al. (2006) Molecular phylogeny and evolution of morphology in the social amoebas. *Science* (New York, N.Y.) 314(5799):661-663.

48. Romeralo M, Landolt J C, Cavender J C, Laursen G A, & Baldauf S L (2010) Two new species of dictyostelid cellular slime molds from Alaska. *Mycologia* 102(3):588-595.

49. Chen G, Zhuchenko O, & Kuspa A (2007) Immune-like phagocyte activity in the social amoeba. *Science* (New York, N.Y.) 317(5838):678-681.

50. Nasser W, et al. (2013) Bacterial discrimination by dictyostelid amoebae reveals the complexity of ancient interspecies interactions. *Current biology: CB* 23(10):862-872.

51. Matz C & Kjelleberg S (2005) Off the hook--how bacteria survive protozoan grazing. *Trends in microbiology* 13(7):302-307.

52. Cosson P & Soldati T (2008) Eat, kill or die: when amoeba meets bacteria. *Current opinion in microbiology* 11(3):271-276.

53. Bonner J T (1982) Evolutionary Strategies and Developmental Constraints in the Cellular Slime Molds. *The American Naturalist* 119(4):530-552.

54. Bonner J T (2009) *The social amoeba: the biology of cellular slime molds* (Princeton University Press, Princeton).

55. Konijn T M, Van De Meene J G, Bonner J T, & Barkley D S (1967) The acrasin activity of adenosine-3',5'-cyclic phosphate. *Proceedings of the National Academy of Sciences of the United States of America* 58(3):1152-1154.

56. Bonner J T (1983) Chemical Signals of Social Amoebae. *Scientific American* 248(4):114-121.

57. Urushihara H (2006) *Dictyostelium discoideum* protocols (Springer).

58. Simpkin V L, Renwick M J, Kelly R, & Mossialos E (2017) Incentivising innovation in antibiotic drug discovery and development: progress, challenges and next steps. *J Antibiot* (Tokyo) 70(12):1087-1096.

59. Ciofu O, Rojo-Molinero E, Macia M D, & Oliver A (2017) Antibiotic treatment of biofilm infections. *APMIS: acta pathologica, microbiologica, et immunologica Scandinavica* 125(4):304-319.

60. Harrison J J, Turner R J, & Ceri H (2005) Persister cells, the biofilm matrix and tolerance to metal cations in biofilm and planktonic *Pseudomonas aeruginosa*. *Environmental microbiology* 7(7):981-994.

61. Thongsomboon W, et al. (2018) Phosphoethanolamine cellulose: A naturally produced chemically modified cellulose. *Science* (New York, N.Y.) 359(6373):334-338.

62. Kumar C G & Anand S K (1998) Significance of microbial biofilms in food industry: a review. *International journal of food microbiology* 42(1-2):9-27.

63. Merritt J H, Kadouri D E, & O'Toole G A (2005) Growing and analyzing static biofilms. *Current protocols in microbiology* Chapter 1:Unit-1B.1.

64. Branda S S, Vik S, Friedman L, & Kolter R (2005) Biofilms: the matrix revisited. *Trends in microbiology* 13(1): 20-26.

65. Richards J J & Melander C (2009) Controlling bacterial biofilms. *Chembiochem: a European journal of chemical biology* 10(14):2287-2294.

66. Donlan R M (2002) Biofilms: microbial life on surfaces. *Emerging infectious diseases* 8(9):881-890.

67. Wolcott R & Dowd S (2011) The role of biofilms: are we hitting the right target? *Plastic and reconstructive surgery* 127 Suppl 1:28s-35s.

68. Bjarnsholt T, Hoiby N, Donelli G, Imbert C, & Forsberg A (2012) Understanding biofilms—are we there yet? *FEMS immunology and medical microbiology* 65(2): 125-126.

69. Bale J S, van Lenteren J C, & Bigler F (2008) Biological control and sustainable food production. *Philosophical transactions of the Royal Society of London. Series B, Biological sciences* 363(1492):761-776.

70. Singh R, Ray P, Das A, & Sharma M (2010) Penetration of antibiotics through *Staphylococcus aureus* and *Staphylococcus epidermidis* biofilms. *Journal of Antimicrobial Chemotherapy* 65(9):1955-1958.

71. Anderl J N, Franklin M J, & Stewart P S (2000) Role of Antibiotic Penetration Limitation in <em>Klebsiella pneumoniae</em>Biofilm Resistance to Ampicillin and Ciprofloxacin. 44(7):1818-1824.

72. Sheikh S, et al. (2018) A New Classification of the Dictyostelids. *Protist* 169(1):1-28.

73. Karsi A & Lawrence M L (2007) Broad host range fluorescence and bioluminescence expression vectors for Gram-negative bacteria. *Plasmid* 57(3):286-295.

74. Meighen E A (1991) Molecular biology of bacterial bioluminescence. *Microbiological reviews* 55(1):123-142.

75. Cosson P, et al. (2002) *Pseudomonas aeruginosa* virulence analyzed in a *Dictyostelium discoideum*host system. *J Bacteriol* 184(11):3027-3033.

76. Alibaud L, et al. (2008) *Pseudomonas aeruginosa* virulence genes identified in a Dictyostelium host model. *Cellular microbiology* 10(3):729-740.

77. Webb C (2017) Design Aspects of Solid State Fermentation as Applied to Microbial Bioprocessing. *Journal of Applied Biotechnology & Bioengineering* 4(1).

78. Soccol C R, et al. (2017) Recent developments and innovations in solid state fermentation. *Biotechnology Research and Innovation* 1(1):52-71.

79. Swann W E (1985) USPTO.

80. Abadias M, Benabarre A, Teixido N, Usall J, & Vinas I (2001) Effect of freeze drying and protectants on viability of the biocontrol yeast Candida sake. *International journal of food microbiology* 65(3):173-182.

81. Larena I, Melgarejo P, & De Cal A (2003) Drying of Conidia of Penicillium oxalicum, a Biological Control Agent against Fusarium Wilt of Tomato. 151(11-12):600-606.

82. Nimonkar Y, Shouche Y S, & Prakash O (2013) Practice and prospects of microbial preservation. *FEMS Microbiology Letters* 339(1):1-9.

83. Berny J F & Hennebert GL (1991) Viability and Stability of Yeast Cells and Filamentous Fungus Spores during Freeze-Drying: Effects of Protectants and Cooling Rates. *Mycologia* 83(6):805-815.

84. Zhan Y, et al. (2012) Screening of freeze-dried protective agents for the formulation of biocontrol strains, Bacillus cereus AR156, Burkholderia vietnamiensis B418 and Pantoea agglomerans 2Re40. *Letters in applied microbiology* 54(1):10-17.

85. Mazur P (1977) The role of intracellular freezing in the death of cells cooled at supraoptimal rates. *Cryobiology* 14(3):251-272.

86. Cotter D A & Raper K B (1966) Spore germination in Dictyostelium discoideum. *Proceedings of the National Academy of Sciences of the United States of America* 56(3):880-887.

87. Loria R (1993) Fusarium Dry Rot of Potato. (Cornell University Department of Plant Pathology, Ithaca, N.Y.), p 726.710.

88. Merida C L & Loria R (1991) Silver Scurf of Potato. (Cornell University Department of Plant Pathology, Ithaca, N.Y.), p 725.790.

89. Geary B, Johnson D A, Hamm P B, James S, & Rykbost K A (2007) Potato Silver Scurf Affected by Tuber Seed Treatments and Locations, and Occurrence of Fungicide Resistant Isolates of Helminthosporium solani. *Plant Dis* 91(3):315-320.

90. Potts G (1902) Zur physiologie des Dictyostelium mucoroides. *Flora* (Jena) 91:281-347.

91. Koller B, et al. (2016) Dictyostelium discoideum as a Novel Host System to Study the Interaction between Phagocytes and Yeasts. *Frontiers in microbiology* 7:1665-1665.

92. Steenbergen J N, Nosanchuk J D, Malliaris S D, & Casadevall A (2003) Cryptococcus neoformans virulence is enhanced after growth in the genetically malleable host Dictyostelium discoideum. *Infection and immunity* 71(9):4862-4872.

93. Hillmann F, et al. (2015) Virulence determinants of the human pathogenic fungus Aspergillus fumigatus protect against soil amoeba predation. *Environmental microbiology* 17(8):2858-2869.

94. Loria R (1991) Potato Scab. (Cornell University Department of Plant Pathology, Ithaca, N.Y.), p 725.780.

95. Lulai EC (2007) Chapter 22—Skin-Set, Wound Healing, and Related Defects. *Potato Biology and Biotechnology*, eds Vreugdenhil D, Bradshaw J, Gebhardt C, Govers F, Mackerron D K L, Taylor M A, & Ross H A (Elsevier Science B.V., Amsterdam), pp 471-500.

96. NASS (2017) Wisconsin Ag News—Potatoes. (United States Department of Agriculture).

97. Anonymous (2019) Top 25 Potato Producing Countries. (Potato Pro).

98. FAS (2014) Fresh and Frozen Potato Products: World Markets and Trade. (United States Department of Agriculture).

99. Trimmer M (2017) Biological Control Global Market Overview. ed Intelligence DIB.

100. Hsiang T, Shi F, & Darbyson A (2014) First Report of Sclerotinia homoeocarpa from the Sedge Trichophorum cespitosum in Eastern Canada, Which Causes Dollar Spot Disease on Lolium perenne and Poa pratensis but not on Agrostis stolonifera. *Plant Dis* 98(1):161.

101. She X M, He Z F, Tang Y F, Du Z G, & Lan G B (2013) First Report of Potato Blackleg Disease Caused by Pectobacterium atrosepticum in Guangdong China. *Plant Dis* 97(12):1652.

102. Lamichhane J R, Balestra G M, & Varvaro L (2010) Occurrence of Potato Soft Rot Caused by Erwinia carotovora (synonym Pectobacterium carotovorum) in Nepal: A First Report. *Plant Dis* 94(3):382.

103. Zhang J X, et al. (2012) First Report of Bacterial Soft Rot of Potato Caused by Pectobacterium carotovorum subsp. carotovorum in Guangdong Province of China. *Plant Dis* 96(12):1819.

104. Maksimenko L A, Parkhomenko N I, Moroz S N, & Gorb T E (2013) [Properties of pectolitic phytopathogenic bacteria isolates obtained in Ukraine]. *Mikrobiolohichnyi zhurnal* (Kiev, Ukraine: 1993) 75(6):66-72.

105. Ranjan R K, Singh D, & Baranwal V K (2016) Simultaneous Detection of Brown Rot- and Soft Rot-Causing Bacterial Pathogens from Potato Tubers Through Multiplex PCR. *Current microbiology* 73(5):652-659.

106. McNally R R, Curland R D, Webster B T, Robinson A P, & Ishimaru C A (2017) First Report of Pectobacterium carotovorum subsp. brasiliensis Causing Blackleg and Stem Rot in Commercial and Seed Potato Fields in Minnesota and North Dakota. *Plant Disease* 101(9):1672-1672.

107. McNally R R, Curland R D, Webster B T, Robinson A P, & Ishimaru C A (2017) First Report of Stem Rot on Potato Caused by Dickeya chrysanthemi in Minnesota. *Plant Disease* 102(1):238-238.

108. Pritchard L, et al. (2013) Detection of phytopathogens of the genus Dickeya using a PCR primer prediction pipeline for draft bacterial genome sequences. 62(3):587-596.

109. NASS (2015) Wisconsin Agricultural Statistics. (United States Department of Agriculture).

110. Anonymous (2016) Best management practices for soft rot associated with Dickeya in potatoes. (Penn State University).

111. Olsen N & Nolte P (2011) Disinfecting Potato Equipment and Storage Facilities. (University of Idaho Extension).

112. Olsen N L, Kleinkopf G E, & Woodell LKJAJoPR (2003) Efficacy of chlorine dioxide for disease control on stored potatoes. 80(6):387-395.

113. Al-Mughrabi K (2010) Post harvest treatment with hydrogen peroxide suppresses silver scurf (*Helminthosporium solani*), dry rot (*Fusarium sambucinum*), and soft rot (*Erinia carotovorum* subsp. *carotovorum*) of stored potatoes. *The Americas Journal of Plant Science and Biotechnology* 4(2):74-81.

114. Olsen N & Miller J (Storage management options for disease control. ed Department of Plant S, and Entomological Studies (University of Idaho).

115. Diallo S, et al. (2011) Mechanisms and recent advances in biological control mediated through the potato rhizosphere. *FEMS microbiology ecology* 75(3):351-364.

116. Kastelein P, Schepel E G, Mulder A, Turkensteen L J, & Van Vuurde J W L (1999) Preliminary selection of antagonists of Erwinia carotovora subsp. atroseptica (Van Hall) Dye for application during green crop lifting of seed potato tubers. *Potato Research* 42(1):161-171.

117. Lim J A, et al. (2013) Biocontrol of *Pectobacterium carotovorum* subsp. *carotovorum* using bacteriophage PP1. *Journal of microbiology and biotechnology* 23(8):1147-1153.

118. Sharga B M & Lyon G D (1998) *Bacillus subtilis* BS 107 as an antagonist of potato blackleg and soft rot bacteria. *Canadian journal of microbiology* 44(8):777-783.

119. Trias R, Baneras L, Montesinos E, & Badosa E (2008) Lactic acid bacteria from fresh fruit and vegetables as biocontrol agents of phytopathogenic bacteria and fungi. *International microbiology: the official journal of the Spanish Society for Microbiology* 11(4):231-236.

120. Adriaenssens E M, et al. (2012) T4-related bacteriophage LIMEstone isolates for the control of soft rot on potato caused by '*Dickeya solani*'. *PLoS One* 7(3):e33227.

121. Balogh B, Jones J B, Iriarte F B, & Momol M T (2010) Phage therapy for plant disease control. *Current pharmaceutical biotechnology* 11(1):48-57.

122. Serafimidis I, Bloomfield G, Skelton J, Ivens A, & Kay R R (2007) A new environmentally resistant cell type from *Dictyostelium*. *Microbiology* (Reading, England) 153 (Pt 2):619-630.

123. Serafimidis I & Kay R R (2005) New prestalk and prespore inducing signals in *Dictyostelium*. *Developmental biology* 282(2):432-441.

124. Filutowicz M & Dorota-Borys K (2013) USPTO.

125. Filutowicz M & Dorota-Borys K (2014) USPTO.

126. Filutowicz M & Dorota-Borys K (2018) Office EP.

All publications and patents mentioned in the above specification are herein incorporated by reference. Various modifications and variations of the described method and system of the disclosure will be apparent to those skilled in the art without departing from the scope and spirit of the disclosure. Although the disclosure has been described in connection with specific preferred embodiments, it should be understood that the disclosure as claimed should not be unduly limited to such specific embodiments. Indeed, various modifications of the described modes for carrying out the disclosure which are obvious to those skilled in the relevant fields are intended to be within the scope of the following claims.

We claim:

1. A method of treating or preventing a bacterial infection in a potato, wherein said bacteria is selected from the group consisting of *Pectobacterium* sp. and/or *Dickeya* sp., comprising:

contacting said plant with a composition comprising one or more species of amoebae; wherein said amoebae are a *Dictyostelium* sp. or a *Heterostelium* sp.

2. The method of claim 1, wherein said bacteria is present as a biofilm.

3. The method of claim 1, wherein said composition comprises two or more species of amoebae.

4. The method of claim 1, wherein said amoebae are selected from the group consisting of Cohen 35, Cohen 36, Cohen 8, Cohen 9, Couch Cl, DC-6, DC-61, DC-7, WS-116d, WS-15, WS-20, WS-517, WS-588, WS-606, WS-647, WS-666, WS-669, WS-69, WS-269a, WS-269b, WS-380b, WS-462, Maryland 5a, AKK5a, and Za-2a.

5. The method of claim 1, wherein said amoebae are selected from the group consisting of Cohen 36, WS-69, and Cohen 9.

6. The method of claim 1, wherein said potato is in storage.

7. The method of claim 1, wherein said contacting treats or prevents soft rot disease caused by said bacterial infection in said potato.

8. The method of claim 6, wherein said storage is at approximately 10 degrees Celsius.

9. The method of claim 1, wherein said contacting comprising contacting seed potatoes prior to planting and/or contacting potatoes after harvest.

10. The method of claim 9, wherein said seed potato is cut.

11. The method of claim 6, wherein said potato is infected with a bacterium of *Pectobacterium* sp. and/or *Dickeya* sp prior to or during storage.

12. The method of claim 1, wherein said composition further comprises a non-amoeba anti-microbial agent.

13. The method of claim 12 wherein said anti-microbial agent is a fungicide.

14. The method of claim 1, wherein said amoebae are lyophilized spores.

15. The method of claim 14, wherein said lyophilized spores are lyophilized in the presence of a stabilizer.

16. The method of claim 15, wherein said stabilizer is nonfat skim milk and/or a polysaccharide.

17. The method of claim 15, wherein said amoebae are present in said composition at a concentration of $1\times10^6$ to $1\times10^8$ spores/mL.

* * * * *

UNITED STATES PATENT AND TRADEMARK OFFICE
CERTIFICATE OF CORRECTION

PATENT NO. : 11,864,559 B2
APPLICATION NO. : 16/904367
DATED : January 9, 2024
INVENTOR(S) : Marcin Filutowicz, Ryan Kessens and Amy Jancewicz It is certified that error appears in the above-identified patent and that said Letters Patent is hereby corrected as shown below:

In the Claims

Claim 4, Column 32, Line 10 reads:
"Cohen 8, Cohen 9, Couch Cl, DC-6, DC-61, DC-7,"

Whereas it should read:
"Cohen 8, Cohen 9, Couch C1, DC-6, DC-61, DC-7,"

Signed and Sealed this
Twenty-sixth Day of March, 2024

Katherine Kelly Vidal
*Director of the United States Patent and Trademark Office*